(12) United States Patent
Fullerton et al.

(10) Patent No.: US 7,823,300 B2
(45) Date of Patent: Nov. 2, 2010

(54) CORRELATED MAGNETIC FOOTWEAR AND METHOD FOR USING THE CORRELATED MAGNETIC FOOTWEAR

(75) Inventors: Larry W. Fullerton, New Hope, AL (US); Mark D. Roberts, Huntsville, AL (US)

(73) Assignee: Cedar Ridge Research, LLC, New Hope, AL (US)

( * ) Notice: Subject to any disclaimer, the term of this patent is extended or adjusted under 35 U.S.C. 154(b) by 0 days.

(21) Appl. No.: 12/479,818

(22) Filed: Jun. 7, 2009

(65) Prior Publication Data

US 2009/0288316 A1 Nov. 26, 2009

Related U.S. Application Data

(63) Continuation-in-part of application No. 12/476,952, filed on Jun. 2, 2009.

(51) Int. Cl.
*H01F 7/02* (2006.01)
*A43B 3/00* (2006.01)
*A43B 5/04* (2006.01)
*A43B 5/16* (2006.01)
*A63C 9/00* (2006.01)

(52) U.S. Cl. ............................ 36/113; 36/114; 36/115; 36/116; 36/117.1; 36/131; 36/136; 280/612; 335/306

(58) Field of Classification Search ................. 335/285, 335/302–306; 24/303; 36/113–117.5, 122, 36/136, 137, 131; 280/612
See application file for complete search history.

(56) References Cited

U.S. PATENT DOCUMENTS

| | | | |
|---|---|---|---|
| 381,968 A | 5/1888 | Tesla | |
| 493,858 A | 3/1893 | Edison | |
| 996,933 A | 7/1911 | Lindquist | |
| 1,236,234 A | 8/1917 | Troje | |
| 2,389,298 A | 11/1945 | Ellis | |
| 2,570,625 A | 10/1951 | Zimmerman et al. | |
| 2,722,617 A | 11/1955 | Cluwen et al. | |
| 2,932,545 A | 4/1960 | Foley | |
| 3,102,314 A | 9/1963 | Alderfer | |
| 3,208,296 A | 9/1965 | Baermann | |

(Continued)

FOREIGN PATENT DOCUMENTS

FR 823395 1/1938

(Continued)

OTHER PUBLICATIONS

"BNS Series-Compatible Series AES Safety Controllers"pp. 1-17, http://www.schmersalusa.com/safety_controllers/drawings/aes.pdf (downloaded on or before Jan. 23, 2009).

(Continued)

*Primary Examiner*—Ramon M Barrera
(74) *Attorney, Agent, or Firm*—William J. Tucker

(57) ABSTRACT

A footwear (e.g., bike shoe, snow ski boot, snowboard boot, wakeboard boot, water ski boot, work boot) is described herein that incorporates correlated magnets which enable a person who has their foot placed within the footwear to attach or remove the footwear to or from a corresponding device (e.g., bike pedal, snow ski, snowboard, wakeboard, water ski, or work platform) which also incorporates correlated magnets.

25 Claims, 15 Drawing Sheets

U.S. PATENT DOCUMENTS

| | | | |
|---|---|---|---|
| 3,288,511 A | 11/1966 | Tavano | |
| 3,468,576 A | 9/1969 | Beyer et al. | |
| 3,474,366 A | 10/1969 | Barney | |
| 3,667,771 A * | 6/1972 | Larson | 280/612 |
| 3,802,034 A | 4/1974 | Bookless | |
| 4,079,558 A | 3/1978 | Gorham | |
| 4,222,489 A | 9/1980 | Hutter | |
| 4,453,294 A | 6/1984 | Morita | |
| 4,547,756 A | 10/1985 | Miller et al. | |
| 4,629,131 A | 12/1986 | Podell | |
| 4,941,236 A | 7/1990 | Sherman | |
| 5,050,276 A | 9/1991 | Pemberton | |
| 5,367,891 A | 11/1994 | Furuyama | |
| 5,383,049 A | 1/1995 | Carr | |
| 5,631,093 A | 5/1997 | Perry et al. | |
| 5,631,618 A | 5/1997 | Trumper et al. | |
| 6,072,251 A | 6/2000 | Markle | |
| 6,170,131 B1 | 1/2001 | Shin | |
| 6,275,778 B1 | 8/2001 | Shimada et al. | |
| 6,457,179 B1 | 10/2002 | Prendergast | |
| 6,607,304 B1 | 8/2003 | Lake et al. | |
| 6,720,698 B2 | 4/2004 | Galbraith | |
| 6,847,134 B2 | 1/2005 | Frissen et al. | |
| 6,862,748 B2 | 3/2005 | Prendergast | |
| 6,927,657 B1 | 8/2005 | Wu | |
| 6,971,147 B2 | 12/2005 | Halstead | |
| 7,066,778 B2 | 6/2006 | Kretzschmar | |
| 7,362,018 B1 | 4/2008 | Kulogo et al. | |
| 7,444,683 B2 | 11/2008 | Prendergast et al. | |
| 2004/0003487 A1 | 1/2004 | Reiter | |
| 2006/0066428 A1 | 3/2006 | McCarthy et al. | |
| 2006/0189259 A1 | 8/2006 | Park | |
| 2006/0290451 A1 | 12/2006 | Prendergast et al. | |
| 2008/0186683 A1 | 8/2008 | Ligtenberg et al. | |
| 2008/0272868 A1 | 11/2008 | Prendergast et al. | |
| 2008/0282517 A1 | 11/2008 | Claro | |

FOREIGN PATENT DOCUMENTS

WO  2007081830 A2  7/2007

OTHER PUBLICATIONS

"Magnetic Safety Sensors" pp. 1-3, http://farnell.com/datasheets/6465.pdf (downloaded on or before Jan. 23, 2009).

"Series BNS-B20 Coded-Magnet Sensor Safety Door Handle" pp. 1-2, http://www.schmersalusa.com/catalog_pdfs/BNS_B20.pdf (downloaded on or before Jan. 23, 2009).

"Series BNS333 Coded-Magnet Sensors with Integrated Safety Control Module" pp. 1-2, http://www.schmersalusa.com/machine_guarding/coded_magnet/drawings/bns333.pdf (downloaded on or before Jan. 23, 2009).

* cited by examiner

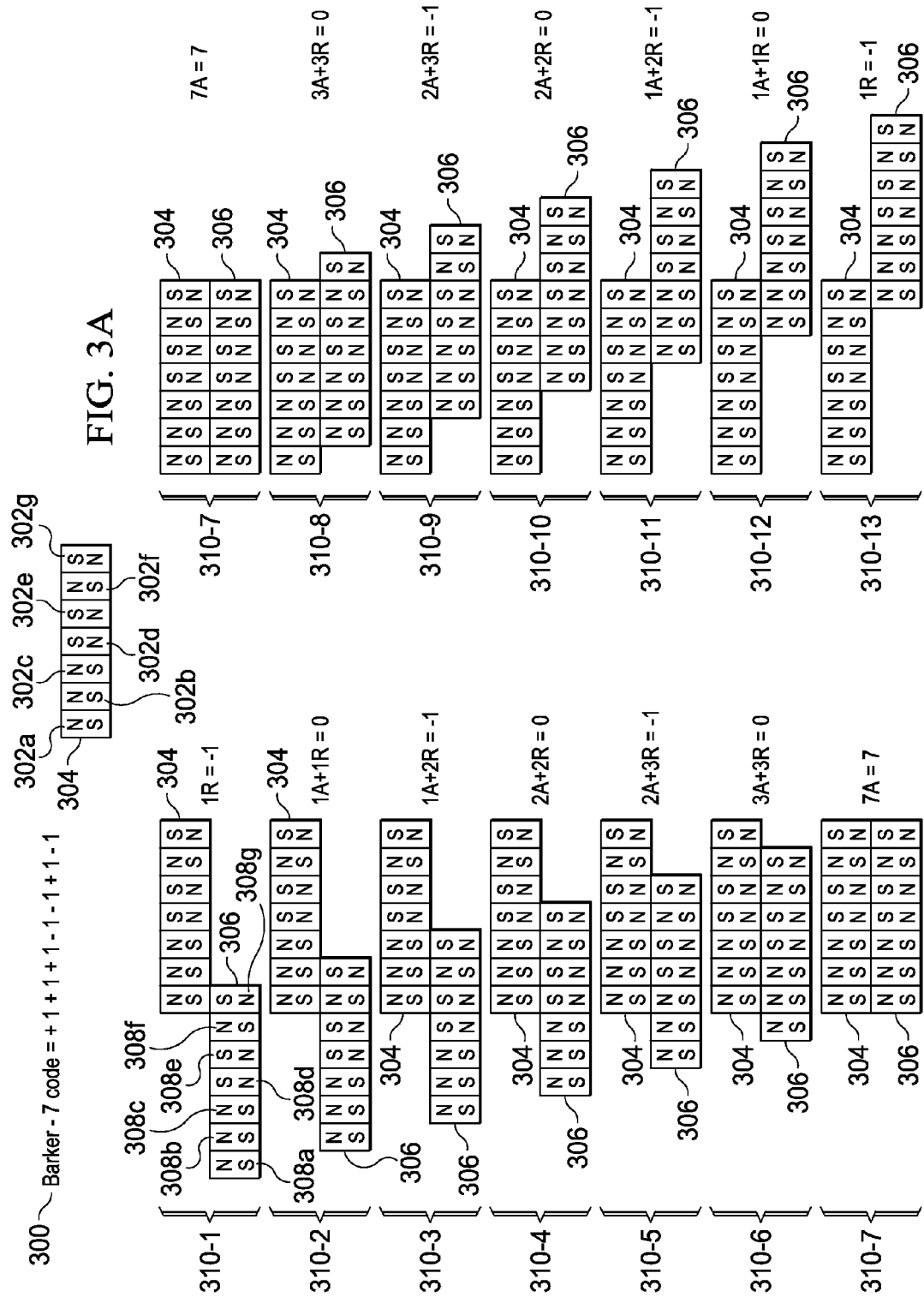

US 7,823,300 B2

CORRELATED MAGNETIC FOOTWEAR AND METHOD FOR USING THE CORRELATED MAGNETIC FOOTWEAR

CROSS REFERENCE TO RELATED APPLICATIONS

This application is a continuation-in-part application of U.S. patent application Ser. No. 12/476,952 filed on Jun. 2, 2009 and entitled "A Field Emission System and Method", which is a continuation-in-part application of U.S. patent application Ser. No. 12/322,561 filed on Feb. 4, 2009 and entitled "A System and Method for Producing an Electric Pulse", which is a continuation-in-part application of U.S. patent application Ser. No. 12/358,423 filed on Jan. 23, 2009 and entitled "A Field Emission System and Method", which is a continuation-in-part application of U.S. patent application Ser. No. 12/123,718 filed on May 20, 2008 and entitled "A Field Emission System and Method". The contents of these four documents are hereby incorporated herein by reference.

TECHNICAL FIELD

The present invention is related to footwear (e.g., bike shoe, snow ski boot, snowboard boot, wakeboard boot, water ski boot, work boot) that incorporates correlated magnets which enable a person who has their foot placed within the footwear to attach or remove the footwear to or from a corresponding device (e.g., bike pedal, snow ski, snowboard, wakeboard, water ski, or work platform) which also incorporates correlated magnets.

DESCRIPTION OF RELATED ART

In the sporting environment, for example, it would be desirable to provide a person with footwear (e.g., bike shoe, snow ski boot, snowboard boot, wakeboard boot, water ski boot) that can be easily attached to and released from a corresponding device (e.g., bike pedal, snow ski, snowboard, wakeboard, water ski). Unfortunately, the traditional footwear and corresponding device employs bindings, loops, buckles, clamps, hooks, or other known fastening mechanisms which require a great degree of dexterity on the part of the person to use when they attach or remove their footwear to or from the device. Accordingly, there has been a need for a new type of footwear and corresponding device which addresses the aforementioned shortcoming and other shortcomings associated with the traditional footwear and its corresponding traditional device. In addition, there is a need for a new type of footwear that can be used in other environments like, for example, construction, entertainment and space. These needs and other needs are satisfied by the present invention.

SUMMARY

In one aspect, the present invention provides an assembly which includes a footwear that incorporates a first field emission structure, and a device that incorporates a second field emission structure, where the footwear is attached to the device when the first and second field emission structures are located next to one another and have a certain alignment with respect to one another, where each of the first and second field emission structures include field emission sources having positions and polarities relating to a desired spatial force function that corresponds to a relative alignment of the first and second field emission structures within a field domain. The footwear can be released from the device when the first and second field emission structures are turned with respect to one another. The term "footwear" as used herein can be any foot holder such as a shoe or boot.

In another aspect, the present invention provides a footwear which has a surface that incorporates a first field emission structure, where the first field emission structure is configured to interface with a second field emission structure incorporated within a device, where the surface is attached to the device when the first and second field emission structures are located next to one another and have a certain alignment with respect to one another, where each of the first and second field emission structures include field emission sources having positions and polarities relating to a desired spatial force function that corresponds to a relative alignment of the first and second field emission structures within a field domain. The footwear can be released from the device when the first and second field emission structures are turned with respect to one another.

In yet another aspect, the present invention provides a device which has a surface that incorporates a first field emission structure, where the first field emission structure is configured to interface with a second field emission structure incorporated within a footwear, where the surface is attached to the footwear when the first and second field emission structures are located next to one another and have a certain alignment with respect to one another, where each of the first and second field emission structures include field emission sources having positions and polarities relating to a desired spatial force function that corresponds to a relative alignment of the first and second field emission structures within a field domain. The device can be released from the footwear when the first and second field emission structures are turned with respect to one another.

In still yet another aspect, the present invention provides a method for enabling a user to attach a foot to a device by: (a) placing the foot within a footwear, where the footwear incorporates a first field emission structure; (b) moving the footwear towards the device, where the device incorporates a second field emission structure; and (c) aligning the footwear with the device such that the footwear will be attached to the device when the first and second field emission structures are located next to one another and have a certain alignment with respect to one another, where each of the first and second field emission structures include field emission sources having positions and polarities relating to a desired spatial force function that corresponds to a relative alignment of the first and second field emission structures within a field domain. The footwear can be released from the device when the first and second field emission structures are turned with respect to one another.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings wherein.

DETAILED DESCRIPTION

The present invention includes a footwear (e.g., bike shoe, snow ski boot, snowboard boot, wakeboard boot, water ski boot, work boot) that incorporates correlated magnets which enable a person who has their foot placed within the footwear to attach or remove the footwear to or from a corresponding device (e.g., bike pedal, snow ski, snowboard, wakeboard, water ski, or work platform) which also incorporates correlated magnets. The footwear and corresponding device both of which utilize correlated magnets are a significant improvement over a conventional footwear and their corresponding conventional device which employ bindings, loops, buckles, clamps, hooks, or other known fastening devices that require a great deal of dexterity on the part of the user so they can attach or remove their show-boot to or from the corresponding device. This significant improvement over the state-of-art is attributable, in part, to the use of an emerging, revolutionary technology that is called correlated magnetics.

This new revolutionary technology called correlated magnetics was first fully described and enabled in the co-assigned U.S. patent application Ser. No. 12/123,718 filed on May 20, 2008 and entitled "A Field Emission System and Method". The contents of this document are hereby incorporated herein by reference. A second generation of a correlated magnetic technology is described and enabled in the co-assigned U.S. patent application Ser. No. 12/358,423 filed on Jan. 23, 2009 and entitled "A Field Emission System and Method". The contents of this document are hereby incorporated herein by reference. A third generation of a correlated magnetic technology is described and enabled in the co-assigned U.S. patent application Ser. No. 12/476,952 filed on Jun. 2, 2009 and entitled "A Field Emission System and Method". The contents of this document are hereby incorporated herein by reference. Another technology known as correlated inductance, which is related to correlated magnetics, has been described and enabled in the co-assigned U.S. patent application Ser. No. 12/322,561 filed on Feb. 4, 2009 and entitled "A System and Method for Producing and Electric Pulse". The contents of this document are hereby incorporated herein by reference. A brief discussion about correlated magnetics is provided first before a detailed discussion is provided about the correlated magnetic footwear and its corresponding correlated magnetic device.

Correlated Magnetics Technology

This section is provided to introduce the reader to basic magnets and the new and revolutionary correlated magnetic technology. This section includes subsections relating to basic magnets, correlated magnets, and correlated electromagnetics. It should be understood that this section is provided to assist the reader with understanding the present invention, and should not be used to limit the scope of the present invention.

A. Magnets

Figure 1:
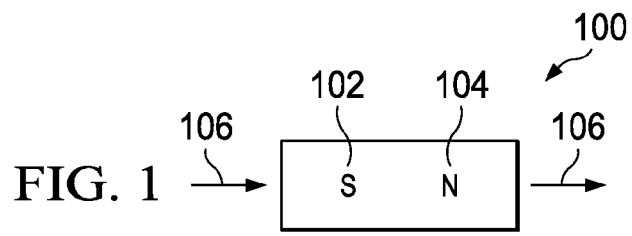
FIGS. 1-9 are various diagrams used to help explain different concepts about correlated magnetic technology which can be utilized in an embodiment of the present invention.

A magnet is a material or object that produces a magnetic field which is a vector field that has a direction and a magnitude (also called strength). Referring to FIG. 1, there is illustrated an exemplary magnet 100 which has a South pole 102 and a North pole 104 and magnetic field vectors 106 that represent the direction and magnitude of the magnet's moment. The magnet's moment is a vector that characterizes the overall magnetic properties of the magnet 100. For a bar magnet, the direction of the magnetic moment points from the South pole 102 to the North pole 104. The North and South poles 104 and 102 are also referred to herein as positive (+) and negative (−) poles, respectively.

Figure 2A:
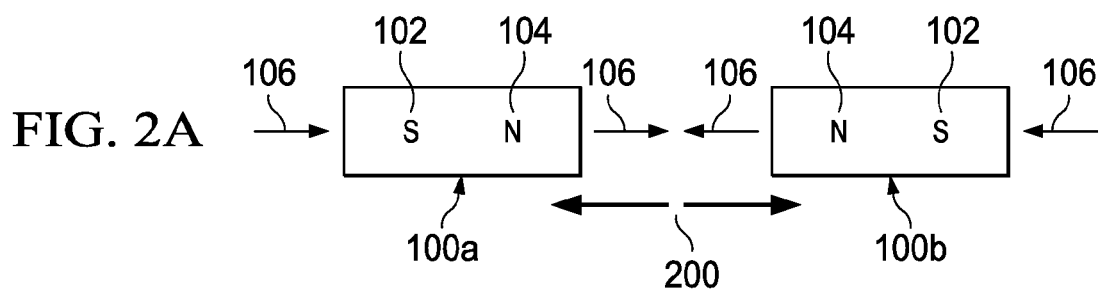
Figure 2B:
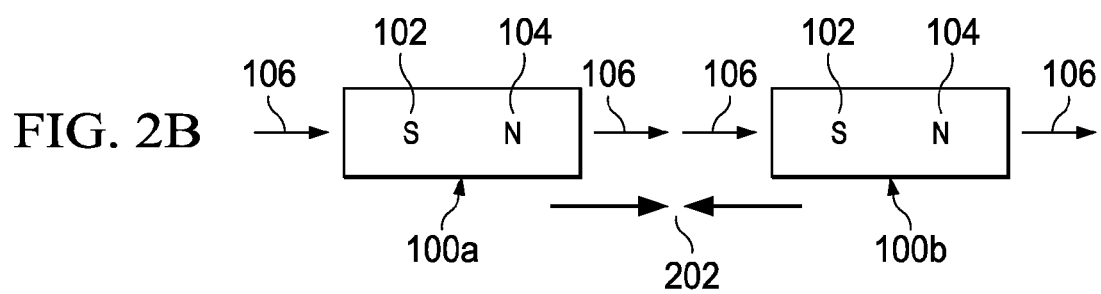
Figure 2C:
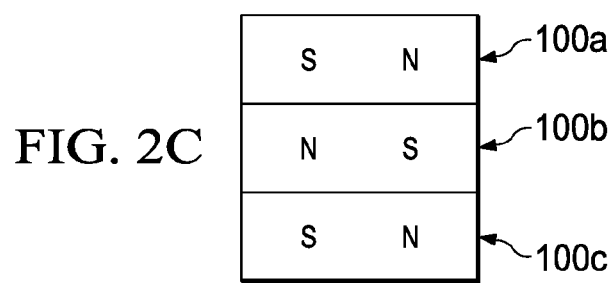

Referring to FIG. 2A, there is a diagram that depicts two magnets 100a and 100b aligned such that their polarities are opposite in direction resulting in a repelling spatial force 200 which causes the two magnets 100a and 100b to repel each other. In contrast, FIG. 2B is a diagram that depicts two magnets 100a and 100b aligned such that their polarities are in the same direction resulting in an attracting spatial force 202 which causes the two magnets 100a and 100b to attract each other. In FIG. 2B, the magnets 100a and 100b are shown as being aligned with one another but they can also be partially aligned with one another where they could still "stick" to each other and maintain their positions relative to each other. FIG. 2C is a diagram that illustrates how magnets 100a, 100b and 100c will naturally stack on one another such that their poles alternate.

B. Correlated Magnets

Correlated magnets can be created in a wide variety of ways depending on the particular application as described in the aforementioned U.S. patent application Ser. Nos. 12/123, 718, 12/358,432, and 12/476,952 by using a unique combination of magnet arrays (referred to herein as magnetic field emission sources), correlation theory (commonly associated with probability theory and statistics) and coding theory (commonly associated with communication systems). A brief discussion is provided next to explain how these widely diverse technologies are used in a unique and novel way to create correlated magnets.

Basically, correlated magnets are made from a combination of magnetic (or electric) field emission sources which have been configured in accordance with a pre-selected code having desirable correlation properties. Thus, when a magnetic field emission structure is brought into alignment with a complementary, or mirror image, magnetic field emission structure the various magnetic field emission sources will all align causing a peak spatial attraction force to be produced, while the misalignment of the magnetic field emission structures cause the various magnetic field emission sources to substantially cancel each other out in a manner that is a function of the particular code used to design the two magnetic field emission structures. In contrast, when a magnetic field emission structure is brought into alignment with a duplicate, magnetic field emission structure then the various magnetic field emission sources all align causing a peak spatial repelling force to be produced, while the misalignment of the magnetic field emission structures causes the various magnetic field emission sources to substantially cancel each other out in a manner that is a function of the particular code used to design the two magnetic field emission structures.

The aforementioned spatial forces (attraction, repelling) have a magnitude that is a function of the relative alignment of two magnetic field emission structures and their corresponding spatial force (or correlation) function, the spacing (or distance) between the two magnetic field emission structures, and the magnetic field strengths and polarities of the various sources making up the two magnetic field emission structures. The spatial force functions can be used to achieve precision alignment and precision positioning not possible with basic magnets. Moreover, the spatial force functions can enable the precise control of magnetic fields and associated spatial forces thereby enabling new forms of attachment devices for attaching objects with precise alignment and new systems and methods for controlling precision movement of objects. An additional unique characteristic associated with correlated magnets relates to the situation where the various magnetic field sources making-up two magnetic field emission structures can effectively cancel out each other when they are brought out of alignment which is described herein as a release force. This release force is a direct result of the particular correlation coding used to configure the magnetic field emission structures.

A person skilled in the art of coding theory will recognize that there are many different types of codes that have different correlation properties which have been used in communications for channelization purposes, energy spreading, modulation, and other purposes. Many of the basic characteristics of such codes make them applicable for use in producing the magnetic field emission structures described herein. For example, Barker codes are known for their autocorrelation properties and can be used to help configure correlated magnets. Although, a Barker code is used in an example below with respect to FIGS. 3A-3B, other forms of codes which may or may not be well known in the art are also applicable to correlated magnets because of their autocorrelation, cross-correlation, or other properties including, for example, Gold codes, Kasami sequences, hyperbolic congruential codes, quadratic congruential codes, linear congruential codes, Welch-Costas array codes, Golomb-Costas array codes, pseudorandom codes, chaotic codes, Optimal Golomb Ruler codes, deterministic codes, designed codes, one dimensional codes, two dimensional codes, three dimensional codes, or four dimensional codes, combinations thereof, and so forth.

Referring to FIG. 3A, there are diagrams used to explain how a Barker length 7 code 300 can be used to determine polarities and positions of magnets 302a, 302b . . . 302g making up a first magnetic field emission structure 304. Each magnet 302a, 302b . . . 302g has the same or substantially the same magnetic field strength (or amplitude), which for the sake of this example is provided as a unit of 1 (where A=Attract, R=Repel, A=−R, A=1, R=−1). A second magnetic field emission structure 306 (including magnets 308a, 308b . . . 308g) that is identical to the first magnetic field emission structure 304 is shown in 13 different alignments 310-1 through 310-13 relative to the first magnetic field emission structure 304. For each relative alignment, the number of magnets that repel plus the number of magnets that attract is calculated, where each alignment has a spatial force in accordance with a spatial force function based upon the correlation function and magnetic field strengths of the magnets 302a, 302b . . . 302g and 308a, 308b . . . 308g. With the specific Barker code used, the spatial force varies from −1 to 7, where the peak occurs when the two magnetic field emission structures 304 and 306 are aligned which occurs when their respective codes are aligned. The off peak spatial force, referred to as a side lobe force, varies from 0 to −1. As such, the spatial force function causes the magnetic field emission structures 304 and 306 to generally repel each other unless they are aligned such that each of their magnets are correlated with a complementary magnet (i.e., a magnet's South pole aligns with another magnet's North pole, or vice versa). In other words, the two magnetic field emission structures 304 and 306 substantially correlate with one another when they are aligned to substantially mirror each other.

Figure 3B:
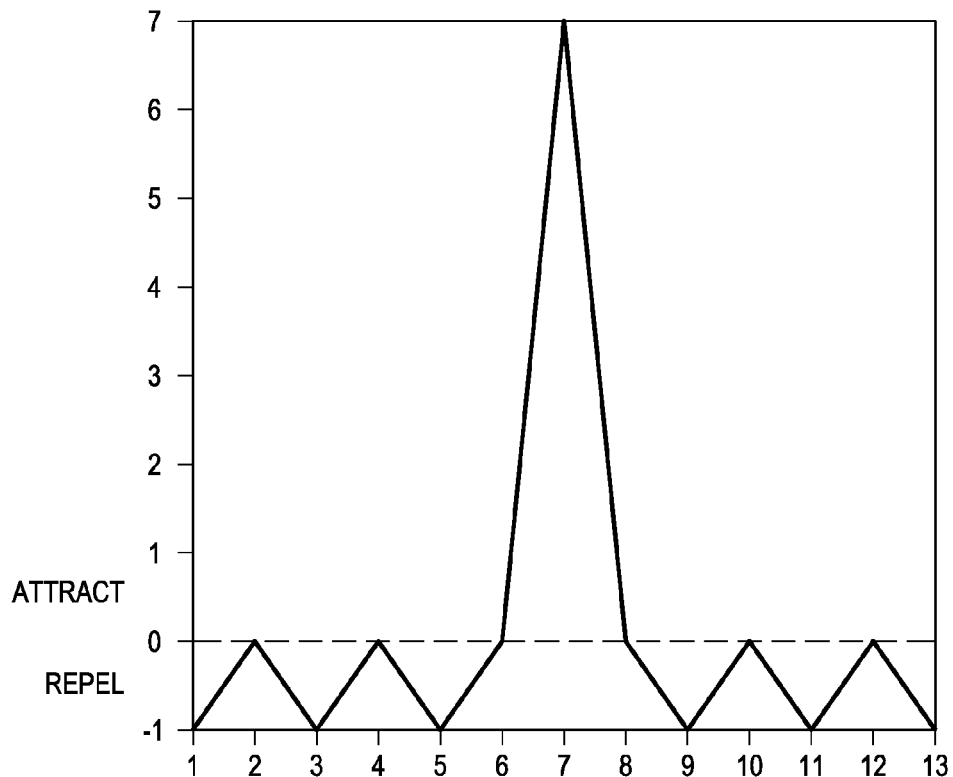

In FIG. 3B, there is a plot that depicts the spatial force function of the two magnetic field emission structures 304 and 306 which results from the binary autocorrelation function of the Barker length 7 code 300, where the values at each alignment position 1 through 13 correspond to the spatial force values that were calculated for the thirteen alignment positions 310-1 through 310-13 between the two magnetic field emission structures 304 and 306 depicted in FIG. 3A. As the true autocorrelation function for correlated magnet field structures is repulsive, and most of the uses envisioned will have attractive correlation peaks, the usage of the term 'autocorrelation' herein will refer to complementary correlation unless otherwise stated. That is, the interacting faces of two such correlated magnetic field emission structures 304 and 306 will be complementary to (i.e., mirror images of) each other. This complementary autocorrelation relationship can be seen in FIG. 3A where the bottom face of the first magnetic field emission structure 304 having the pattern 'S S S N N S N' is shown interacting with the top face of the second magnetic field emission structure 306 having the pattern 'N N N S S N S', which is the mirror image (pattern) of the bottom face of the first magnetic field emission structure 304.

Figure 4A:
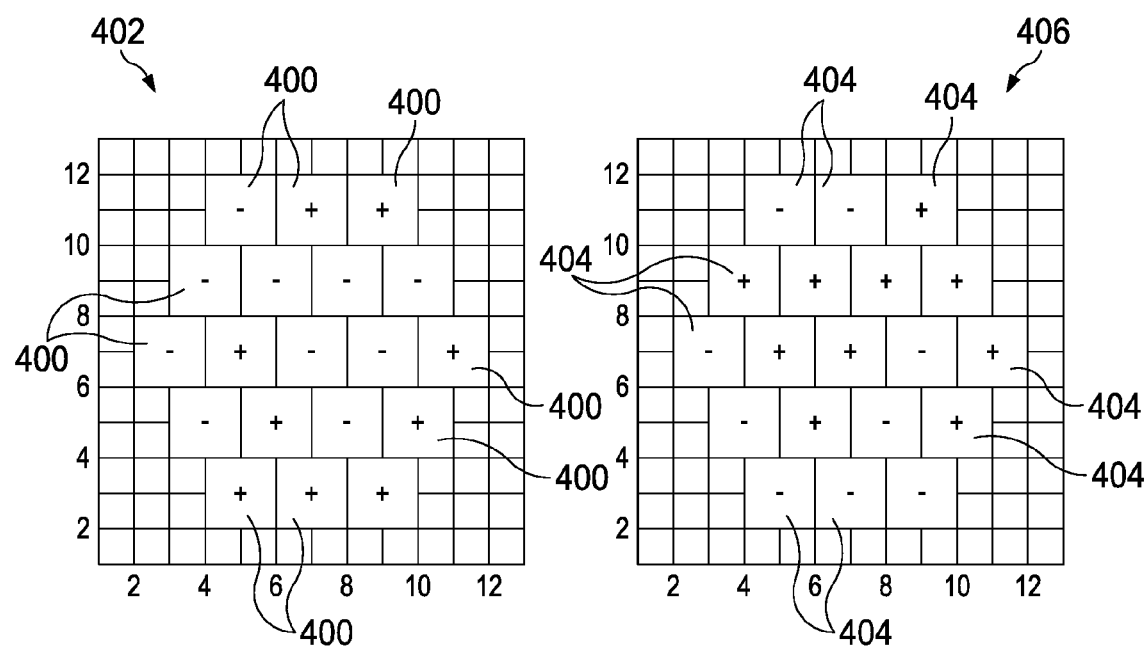
Figure 4B:
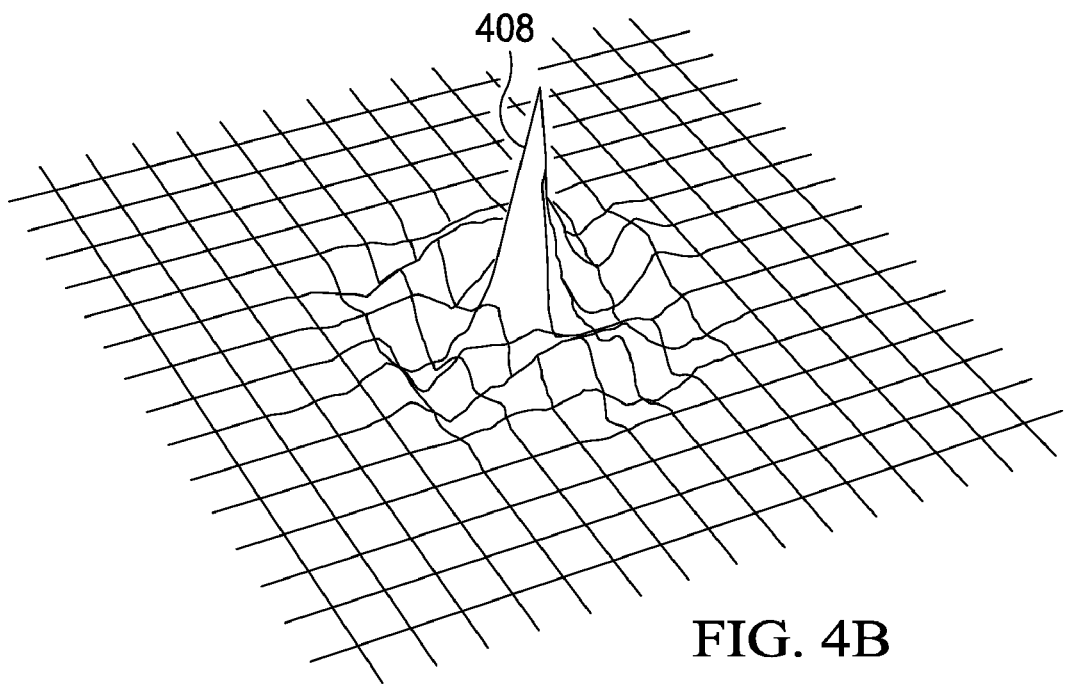
Figure 4C:
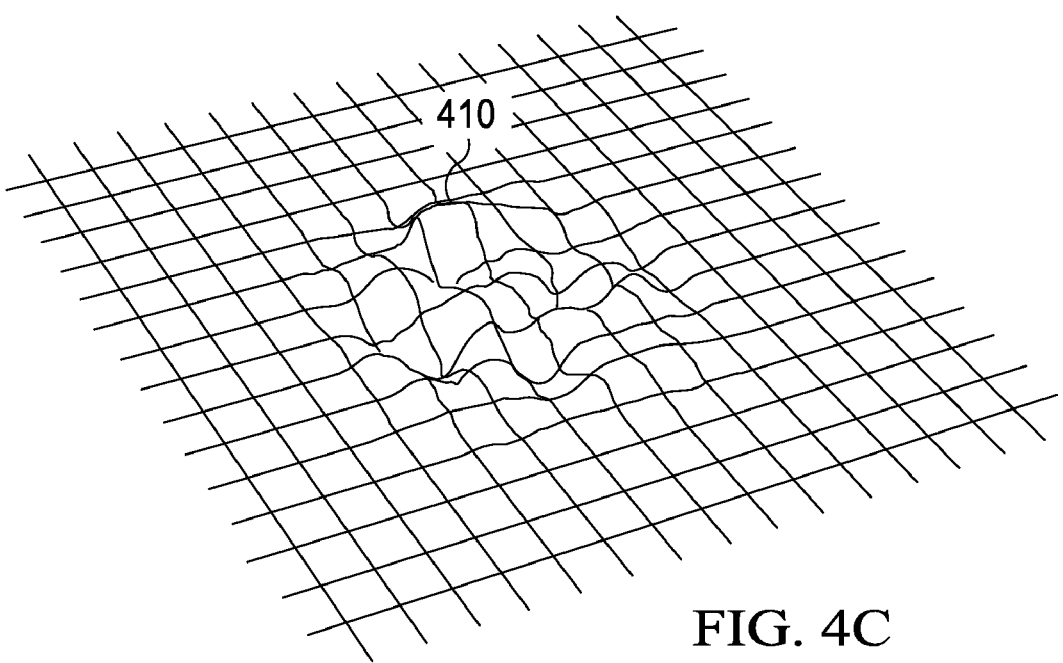

Referring to FIG. 4A, there is a diagram of an array of 19 magnets 400 positioned in accordance with an exemplary code to produce an exemplary magnetic field emission structure 402 and another array of 19 magnets 404 which is used to produce a mirror image magnetic field emission structure 406. In this example, the exemplary code was intended to produce the first magnetic field emission structure 402 to have a first stronger lock when aligned with its mirror image magnetic field emission structure 406 and a second weaker lock when it is rotated 90° relative to its mirror image magnetic field emission structure 406. FIG. 4B depicts a spatial force function 408 of the magnetic field emission structure 402 interacting with its mirror image magnetic field emission structure 406 to produce the first stronger lock. As can be seen, the spatial force function 408 has a peak which occurs when the two magnetic field emission structures 402 and 406 are substantially aligned. FIG. 4C depicts a spatial force function 410 of the magnetic field emission structure 402 interacting with its mirror magnetic field emission structure 406 after being rotated 90°. As can be seen, the spatial force function 410 has a smaller peak which occurs when the two magnetic field emission structures 402 and 406 are substantially aligned but one structure is rotated 90°. If the two magnetic field emission structures 402 and 406 are in other positions then they could be easily separated.

Figure 5:
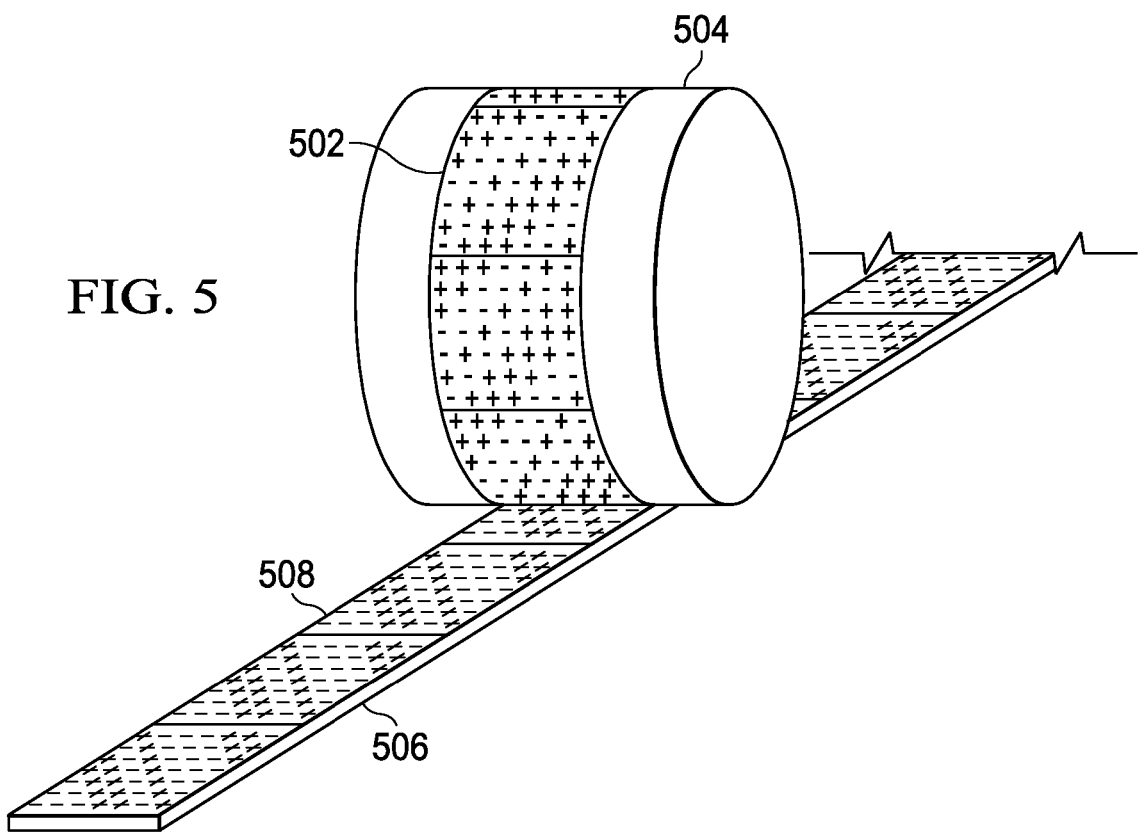

Referring to FIG. 5, there is a diagram depicting a correlating magnet surface 502 being wrapped back on itself on a cylinder 504 (or disc 504, wheel 504) and a conveyor belt/tracked structure 506 having located thereon a mirror image correlating magnet surface 508. In this case, the cylinder 504 can be turned clockwise or counter-clockwise by some force so as to roll along the conveyor belt/tracked structure 506. The fixed magnetic field emission structures 502 and 508 provide a traction and gripping (i.e., holding) force as the cylinder 504 is turned by some other mechanism (e.g., a motor). The gripping force would remain substantially constant as the cylinder 504 moved down the conveyor belt/tracked structure 506 independent of friction or gravity and could therefore be used to move an object about a track that moved up a wall, across a ceiling, or in any other desired direction within the limits of the gravitational force (as a function of the weight of the object) overcoming the spatial force of the aligning magnetic field emission structures 502 and 508. If desired, this cylinder 504 (or other rotary devices) can also be operated against other rotary correlating surfaces to provide a gear-like operation. Since the hold-down force equals the traction force, these gears can be loosely connected and still give positive, non-slipping rotational accuracy. Plus, the magnetic field emission structures 502 and 508 can have surfaces which are perfectly smooth and still provide positive, non-slip traction. In contrast to legacy friction-based wheels, the traction force provided by the magnetic field emission structures 502 and 508 is largely independent of the friction forces between the traction wheel and the traction surface and can be employed with low friction surfaces. Devices moving about based on magnetic traction can be operated independently of gravity for example in weightless conditions including space, underwater, vertical surfaces and even upside down.

Figure 6:
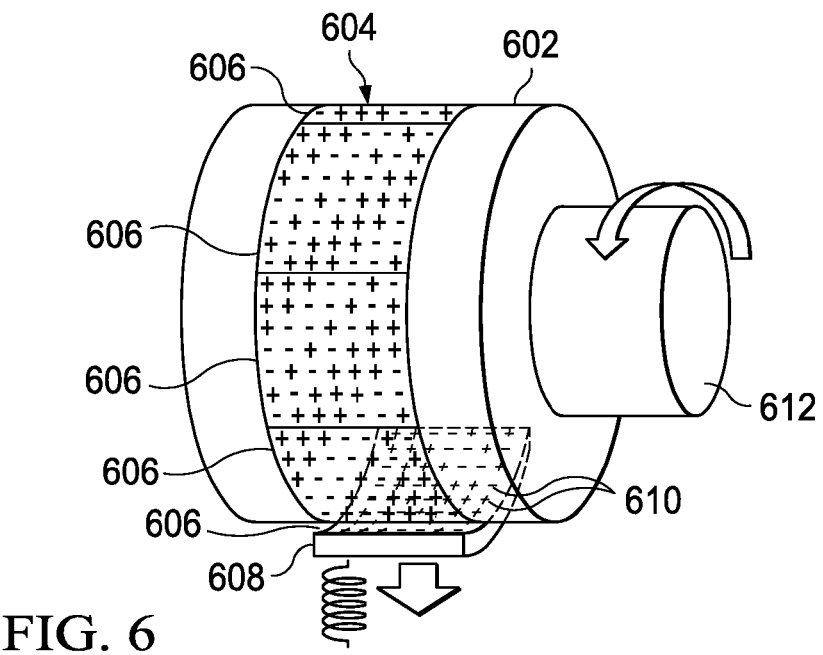

Referring to FIG. 6, there is a diagram depicting an exemplary cylinder 602 having wrapped thereon a first magnetic field emission structure 604 with a code pattern 606 that is repeated six times around the outside of the cylinder 602. Beneath the cylinder 602 is an object 608 having a curved surface with a slightly larger curvature than the cylinder 602 and having a second magnetic field emission structure 610 that is also coded using the code pattern 606. Assume, the cylinder 602 is turned at a rotational rate of 1 rotation per second by shaft 612. Thus, as the cylinder 602 turns, six times a second the first magnetic field emission structure 604 on the cylinder 602 aligns with the second magnetic field emission structure 610 on the object 608 causing the object 608 to be repelled (i.e., moved downward) by the peak spatial force function of the two magnetic field emission structures 604 and 610. Similarly, had the second magnetic field emission structure 610 been coded using a code pattern that mirrored code pattern 606, then 6 times a second the first magnetic field emission structure 604 of the cylinder 602 would align with the second magnetic field emission structure 610 of the object 608 causing the object 608 to be attracted (i.e., moved upward) by the peak spatial force function of the two magnetic field emission structures 604 and 610. Thus, the movement of the cylinder 602 and the corresponding first magnetic field emission structure 604 can be used to control the movement of the object 608 having its corresponding second magnetic field emission structure 610. One skilled in the art will recognize that the cylinder 602 may be connected to a shaft 612 which may be turned as a result of wind turning a windmill, a water wheel or turbine, ocean wave movement, and other methods whereby movement of the object 608 can result from some source of energy scavenging. As such, correlated magnets enables the spatial forces between objects to be precisely controlled in accordance with their movement and also enables the movement of objects to be precisely controlled in accordance with such spatial forces.

In the above examples, the correlated magnets 304, 306, 402, 406, 502, 508, 604 and 610 overcome the normal 'magnet orientation' behavior with the aid of a holding mechanism such as an adhesive, a screw, a bolt & nut, etc. . . . . In other cases, magnets of the same magnetic field emission structure could be sparsely separated from other magnets (e.g., in a sparse array) such that the magnetic forces of the individual magnets do not substantially interact, in which case the polarity of individual magnets can be varied in accordance with a code without requiring a holding mechanism to prevent magnetic forces from 'flipping' a magnet. However, magnets are typically close enough to one another such that their magnetic forces would substantially interact to cause at least one of them to 'flip' so that their moment vectors align but these magnets can be made to remain in a desired orientation by use of a holding mechanism such as an adhesive, a screw, a bolt & nut, etc. . . . . As such, correlated magnets often utilize some sort of holding mechanism to form different magnetic field emission structures which can be used in a wide-variety of applications like, for example, a turning mechanism, a tool insertion slot, alignment marks, a latch mechanism, a pivot mechanism, a swivel mechanism, a lever, a drill head assembly, a hole cutting tool assembly, a machine press tool, a gripping apparatus, a slip ring mechanism, and a structural assembly.

C. Correlated Electromagnetics

Correlated magnets can entail the use of electromagnets which is a type of magnet in which the magnetic field is produced by the flow of an electric current. The polarity of the magnetic field is determined by the direction of the electric current and the magnetic field disappears when the current ceases. Following are a couple of examples in which arrays of electromagnets are used to produce a first magnetic field emission structure that is moved over time relative to a second magnetic field emission structure which is associated with an object thereby causing the object to move.

Figure 7:
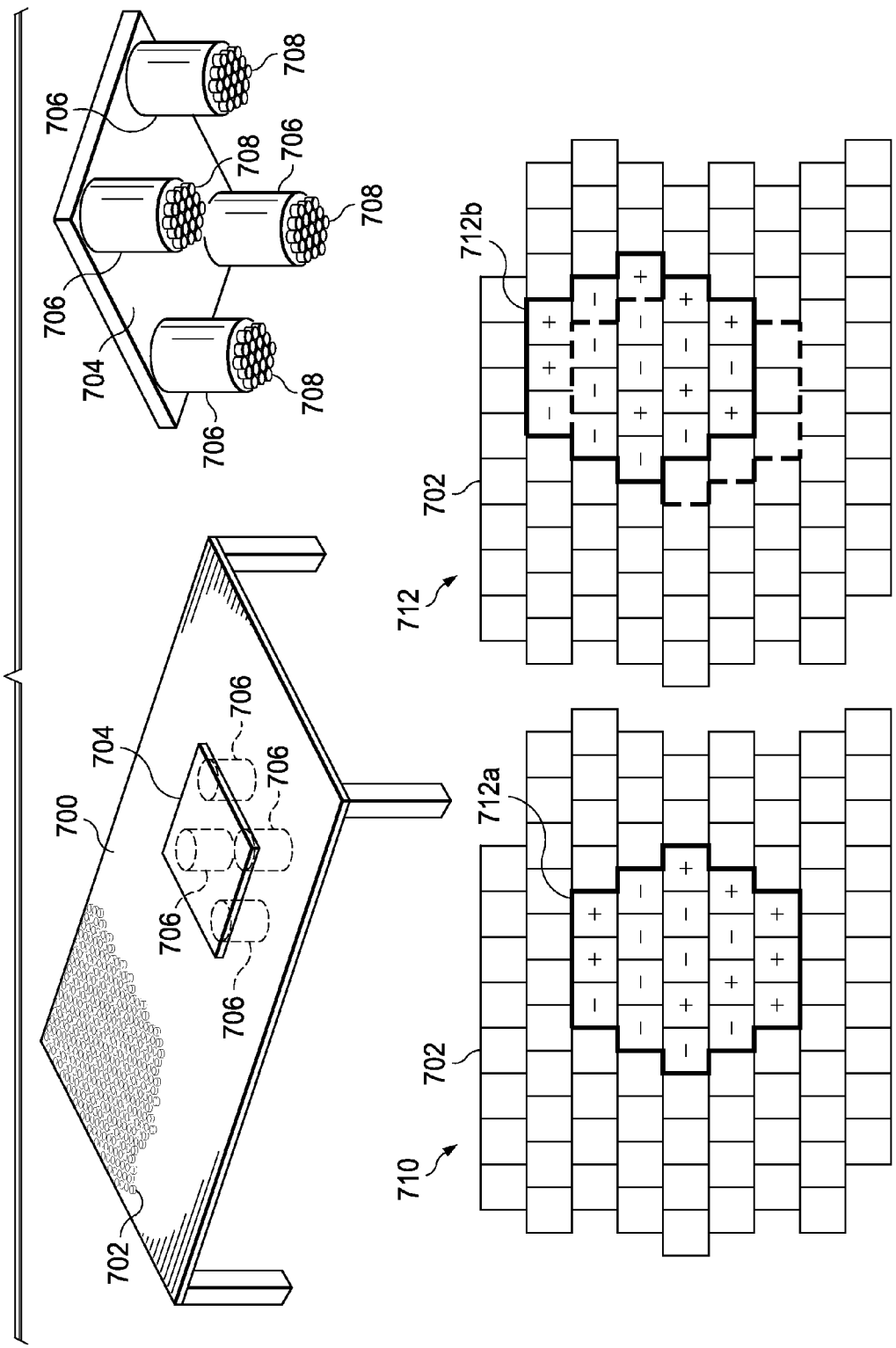

Referring to FIG. 7, there are several diagrams used to explain a 2-D correlated electromagnetics example in which there is a table 700 having a two-dimensional electromagnetic array 702 (first magnetic field emission structure 702) beneath its surface and a movement platform 704 having at least one table contact member 706. In this example, the movement platform 704 is shown having four table contact members 706 each having a magnetic field emission structure 708 (second magnetic field emission structures 708) that would be attracted by the electromagnetic array 702. Computerized control of the states of individual electromagnets of the electromagnet array 702 determines whether they are on or off and determines their polarity. A first example 710 depicts states of the electromagnetic array 702 configured to cause one of the table contact members 706 to attract to a subset 712a of the electromagnets within the magnetic field emission structure 702. A second example 712 depicts different states of the electromagnetic array 702 configured to cause the one table contact member 706 to be attracted (i.e., move) to a different subset 712b of the electromagnets within the field emission structure 702. Per the two examples, one skilled in the art can recognize that the table contact member(s) 706 can be moved about table 700 by varying the states of the electromagnets of the electromagnetic array 702.

Figure 8:
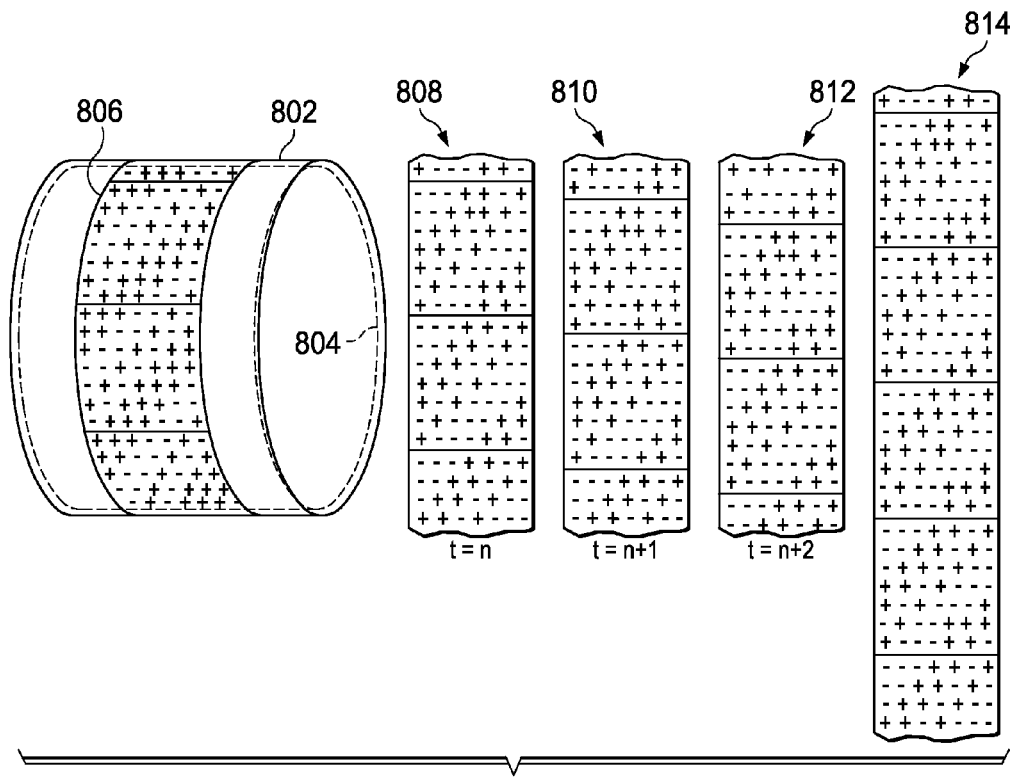

Referring to FIG. 8, there are several diagrams used to explain a 3-D correlated electromagnetics example where there is a first cylinder 802 which is slightly larger than a second cylinder 804 that is contained inside the first cylinder 802. A magnetic field emission structure 806 is placed around the first cylinder 802 (or optionally around the second cylinder 804). An array of electromagnets (not shown) is associated with the second cylinder 804 (or optionally the first cylinder 802) and their states are controlled to create a moving mirror image magnetic field emission structure to which the magnetic field emission structure 806 is attracted so as to cause the first cylinder 802 (or optionally the second cylinder 804) to rotate relative to the second cylinder 804 (or optionally the first cylinder 802). The magnetic field emission structures 808, 810, and 812 produced by the electromagnetic array on the second cylinder 804 at time t=n, t=n+1, and t=n+2, show a pattern mirroring that of the magnetic field emission structure 806 around the first cylinder 802. The pattern is shown moving downward in time so as to cause the first cylinder 802 to rotate counterclockwise. As such, the speed and direction of movement of the first cylinder 802 (or the second cylinder 804) can be controlled via state changes of the electromagnets making up the electromagnetic array. Also depicted in FIG. 8 there is an electromagnetic array 814 that corresponds to a track that can be placed on a surface such that a moving mirror image magnetic field emission structure can be used to move the first cylinder 802 backward or forward on the track using the same code shift approach shown with magnetic field emission structures 808, 810, and 812 (compare to FIG. 5).

Figure 9:
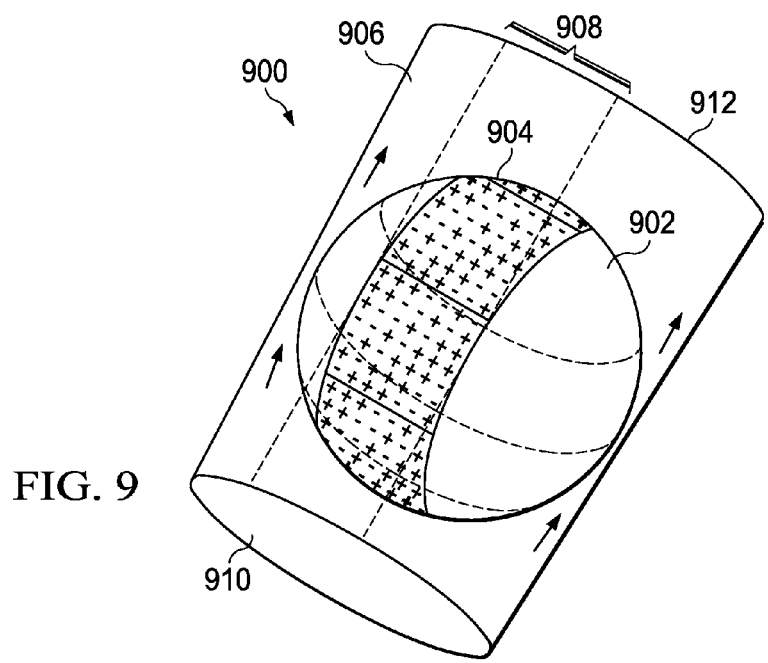

Referring to FIG. 9, there is illustrated an exemplary valve mechanism 900 based upon a sphere 902 (having a magnetic field emission structure 904 wrapped thereon) which is located in a cylinder 906 (having an electromagnetic field emission structure 908 located thereon). In this example, the electromagnetic field emission structure 908 can be varied to move the sphere 902 upward or downward in the cylinder 906 which has a first opening 910 with a circumference less than or equal to that of the sphere 902 and a second opening 912 having a circumference greater than the sphere 902. This configuration is desirable since one can control the movement of the sphere 902 within the cylinder 906 to control the flow rate of a gas or liquid through the valve mechanism 900. Similarly, the valve mechanism 900 can be used as a pressure control valve. Furthermore, the ability to move an object within another object having a decreasing size enables various types of sealing mechanisms that can be used for the sealing of windows, refrigerators, freezers, food storage containers, boat hatches, submarine hatches, etc., where the amount of sealing force can be precisely controlled. One skilled in the art will recognize that many different types of seal mechanisms that include gaskets, o-rings, and the like can be employed with the use of the correlated magnets. Plus, one skilled in the art will recognize that the magnetic field emission structures can have an array of sources including, for example, a permanent magnet, an electromagnet, an electret, a magnetized ferromagnetic material, a portion of a magnetized ferromagnetic material, a soft magnetic material, or a superconductive magnetic material, some combination thereof, and so forth.

Correlated Magnetic Footwear and Corresponding Device

Referring to FIGS. 10-13, there are disclosed three exemplary correlated magnetic footwear 1000, 1200 and 1300 and their corresponding devices 1002, 1202 and 1302 in accordance with different embodiments of the present invention. Although the three exemplary footwear 1000, 1200 and 1300 described are a bike shoe 1000, a snow ski boot 1200 and a snowboard boot 1300, and the three corresponding devices 1002, 1202 and 1302 described are a bike pedal 1002, a snow ski 1202 and a snowboard 1302, it should be understood that correlated magnetic footwear and their corresponding devices can be configured for a wide-variety of applications including, for example, water ski boots-water skies, wakeboard boots-wakeboards and work boots-work platform. Accordingly, the correlated magnetic footwear 1000, 1200 and 1300 and their corresponding devices 1002, 1202 and 1302 should not be construed in a limited manner.

Figure 10A:
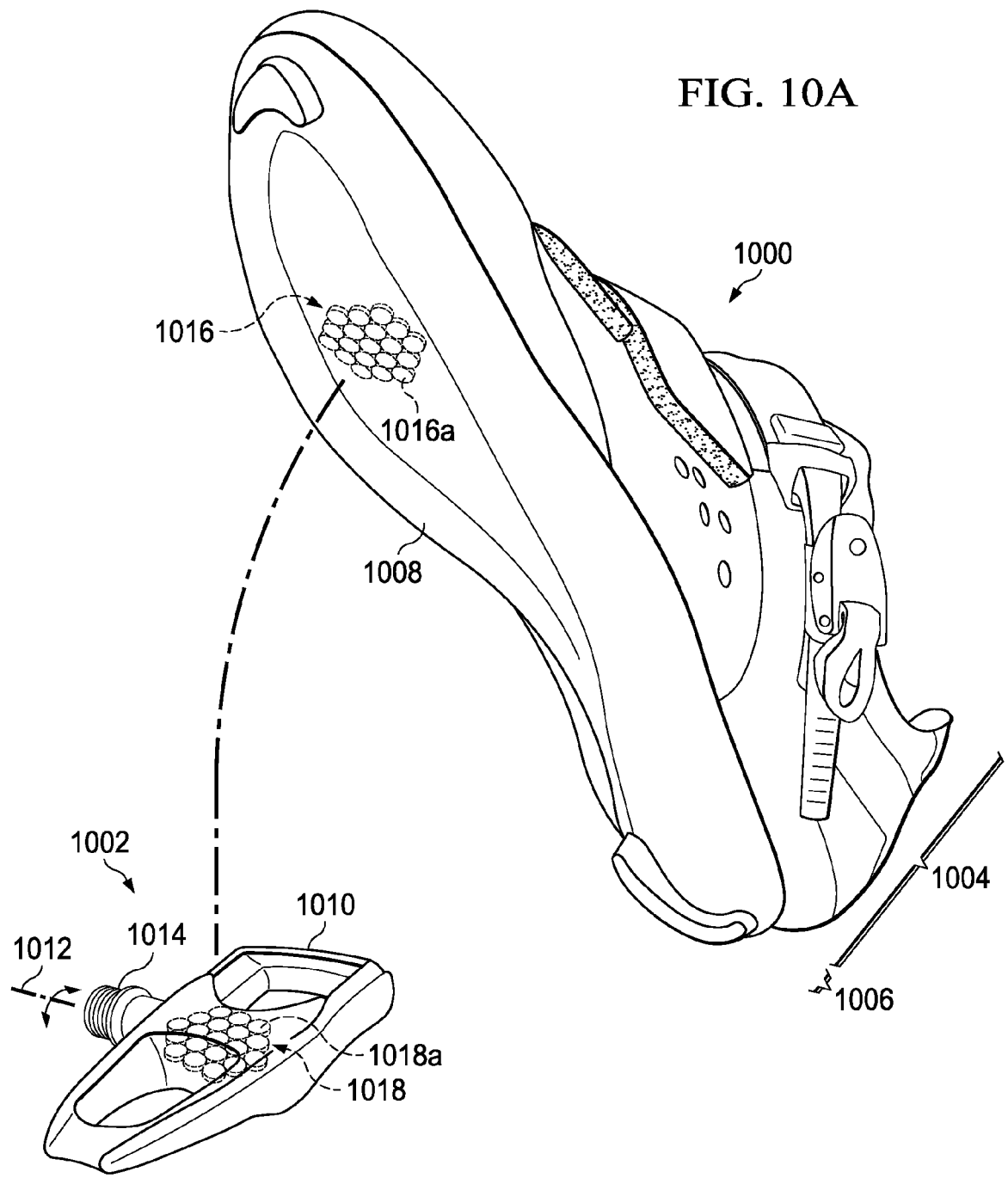
FIG. 10 is a diagram of an exemplary correlated magnetic bike shoe and an exemplary correlated magnetic bike pedal in accordance with an embodiment of the present invention.
Figure 10B:
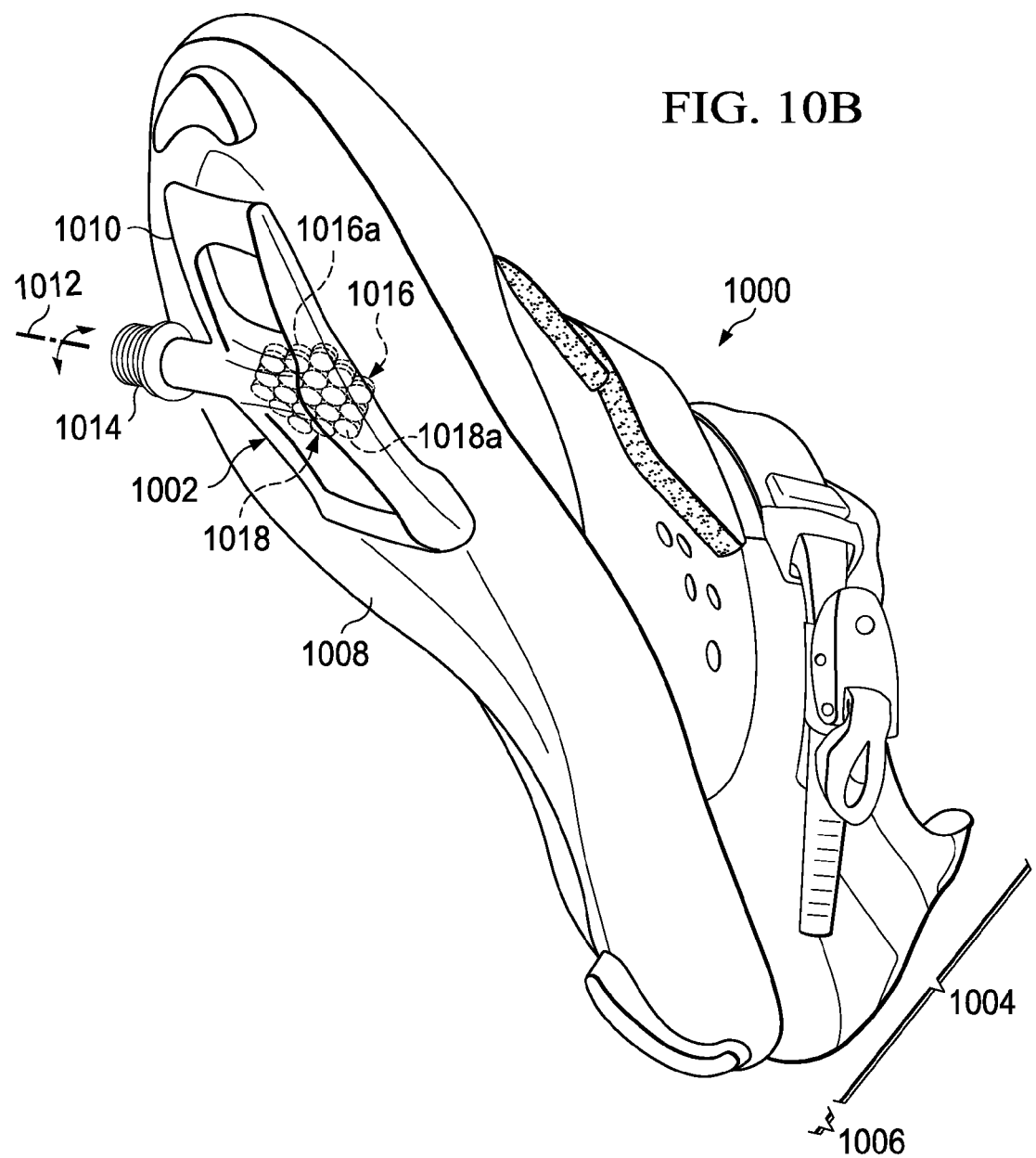

Referring to FIGS. 10A-10B, there are diagrams of an exemplary correlated magnetic bike shoe 1000 and a corresponding correlated magnetic bike pedal 1002 in accordance with an embodiment of the present invention. The bike shoe 1000 has an upper peripheral portion 1004 which is fixedly coupled to a shoe sole portion 1006 which has an outer surface 1008 that interfaces with the corresponding bike pedal 1002. The precise construction of the upper peripheral portion 1004 and the shoe sole portion 1006 will not be discussed or illustrated in detail herein, since the basic construction of a bicycle shoe is well-known in the art. The bike pedal 1002 includes a main body 1010 that is pivotable about a transverse axis 1012 and has a spindle bolt 1014 extending therefrom for connecting to a bicycle (not shown). Likewise, the precise construction of main body 1010 and spindle bolt 1014 will not be discussed or illustrated in detail herein, since the basic construction of a bicycle pedal is well-known in the art. Moreover, it should be apparent to those skilled in the art that the present invention should not be limited to the precise construction of the non-claimed portion of the bike shoe 1000 and bike pedal 1002 as discussed and illustrated herein.

In one embodiment, the bike shoe 1000 has a first field emission structure 1016 (more possible) incorporated within or attached to the outer surface 1008. The bike pedal 1002 has a second field emission structure 1018 (more possible) incorporated within or attached to the main body 1010. The first magnetic field emission structure 1016 is configured to interact with the second magnetic field emission structure 1018 such that the bike shoe 1000 can be attached (secured) to or removed from the bike pedal 1002 when desired. In particular, the bike shoe 1000 can be attached to the bike pedal 1002 when their respective first and second magnetic field emission structures 1016 and 1018 are located next to one another and have a certain alignment with respect to one another (see FIG. 10B). The bike shoe 1000 is attached to the bike pedal 1002 with a desired strength to prevent the bike shoe 1000 from being disengaged from the bike pedal 1002 inadvertently, particularly while the user is riding the bicycle. The bike shoe 1000 can be released from the bike pedal 1002 when their respective first and second magnetic field emission structures 1016 and 1018 are turned with respect to one another (see FIG. 10A).

The process of attaching and detaching the bike shoe 1000 to and from the bike pedal is possible because the first and second magnetic field emission structures 1016 and 1018 each comprise of an array of field emission sources 1016a and 1018a (e.g., an array of magnets 1016a and 1018a) each having positions and polarities relating to a desired spatial force function that corresponds to a relative alignment of the first and second magnetic field emission structures 1016 and 1018 within a field domain (see discussion about correlated magnet technology). It should be appreciated that the first and second field emission structures 1016 and 1018 (and other pairs of field emission structures) depicted in FIGS. 10A-10B and in other drawings associated with the exemplary correlated magnetic footwear 1000, 1200 and 1300 are themselves exemplary. Generally, the field emission structures 1016 and 1018 (and other pairs of field emission structures) could have many different configurations and could be many different types of permanent magnets, electromagnets, and/or electro-permanent magnets where their size, shape, source strengths, coding, and other characteristics can be tailored to meet different requirements. An example of how the bike shoe 1000 can be attached (secured) to or removed from the bike pedal 1002 is discussed in detail below with respect to FIGS. 11A-11I.

Figure 11A:
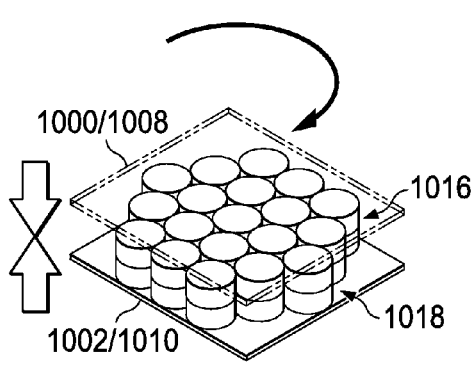
FIGS. 11A-11I are several diagrams that illustrate a portion of the bike shoe and bike pedal which are used to show how an exemplary first magnetic field emission structure (attached to the bike shoe) and its mirror image second magnetic field emission structure (attached to the bike pedal) can be aligned or misaligned relative to each other to enable one to secure or remove the bike shoe to or from the bike pedal in accordance with an embodiment of the present invention.
Figure 11D:
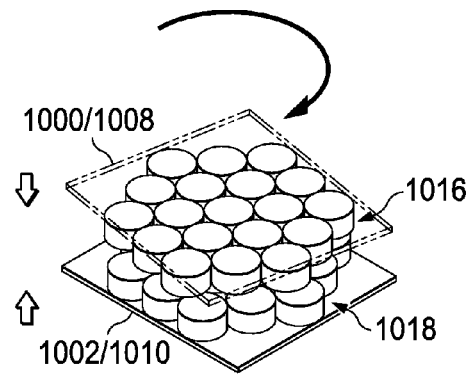
Figure 11B:
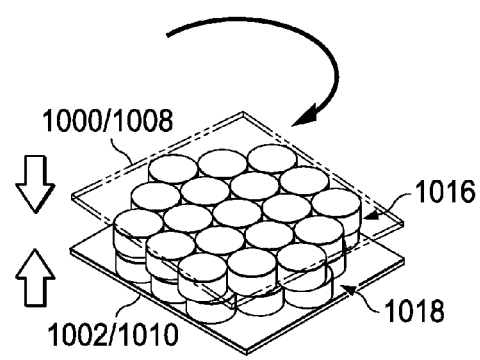
Figure 11E:
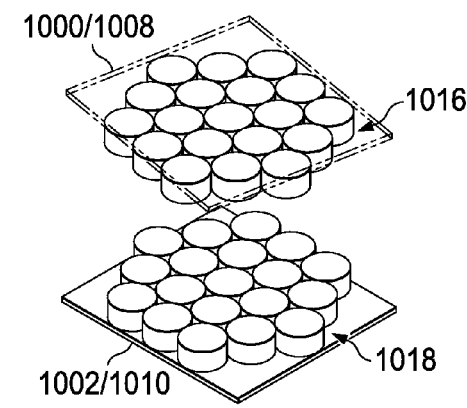
Figure 11C:
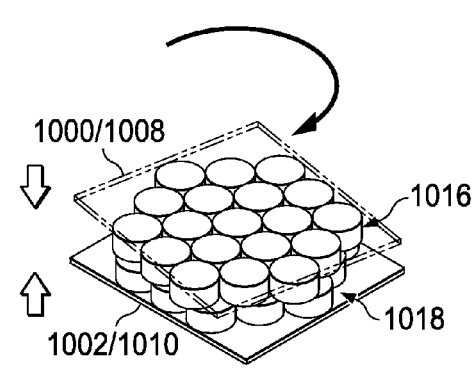
Figure 11F:
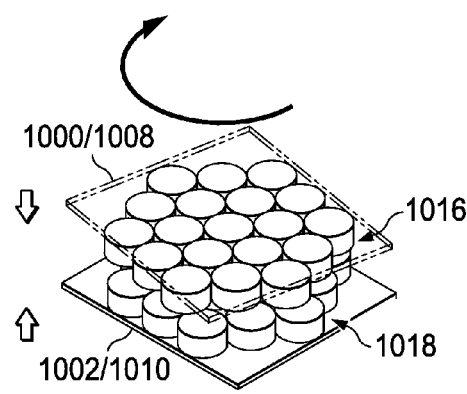
Figure 11G:
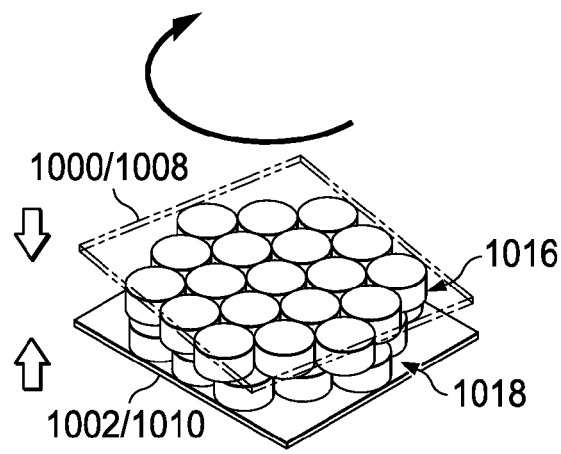
Figure 11H:
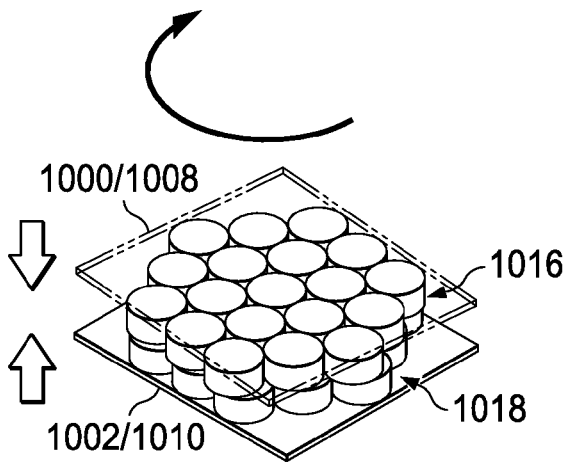
Figure 11I:
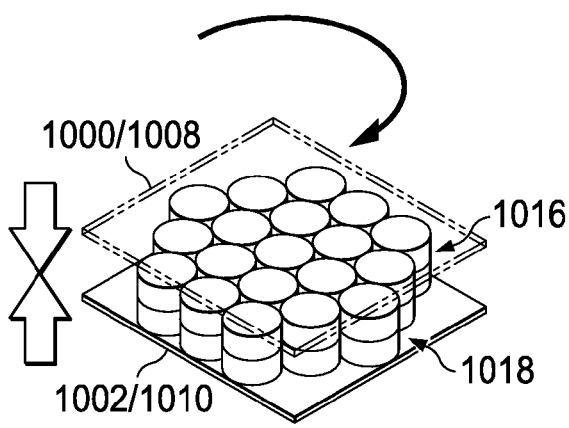

Referring to FIGS. 11A-11I, there is depicted an exemplary first magnetic field emission structure 1016 (attached to the bike shoe 1000) and its mirror image second magnetic field emission structure 1018 (attached to the bike pedal 1002) and the resulting spatial forces produced in accordance with their various alignments as they are twisted relative to each other which enables the user to secure or remove the bike shoe 1000 to or from the bike pedal 1002. In FIG. 11A, the first magnetic field emission structure 1016 and the mirror image second magnetic field emission structure 1018 are aligned producing a peak spatial force. In FIG. 11B, the first magnetic field emission structure 1018 is rotated clockwise slightly relative to the mirror image second magnetic field emission structure 1018 and the attractive force reduces significantly. The user would normally turn their foot which is located in the bike shoe 1000 to rotate the first magnetic field emission structure 1018 relative to the mirror image second magnetic field emission structure 1018 associated with the bike pedal 1002. In FIG. 11C, the first magnetic field emission structure 1016 is further rotated and the attractive force continues to decrease. In FIG. 11D, the first magnetic field emission structure 1016 is still further rotated until the attractive force becomes very small, such that the two magnetic field emission structures 1016 and 1018 are easily separated as shown in FIG. 11E. One skilled in the art would also recognize that the bike shoe 1000 can also be detached from the bike pedal 1002 by applying a pull force, shear force, or any other force sufficient to overcome the attractive peak spatial force between the substantially aligned first and second field emission structures 1016 and 1018. Given the two magnetic field emission structures 1016 and 1018 held somewhat apart as in FIG. 11E, the two magnetic field emission structures 1016 and 1018 can be moved closer and rotated towards alignment producing a small spatial force as in FIG. 11F. The spatial force increases as the two magnetic field emission structures 1016 and 1018 become more and more aligned in FIGS. 11G and 11H and a peak spatial force is achieved when aligned as in FIG. 11I. It should be noted that the direction of rotation was arbitrarily chosen and may be varied depending on the code employed. Additionally, the second magnetic field emission structure 1018 is the mirror of the first magnetic field emission structure 1016 resulting in an attractive peak spatial force (see also FIGS. 3-4). This way of securing and removing the bike shoe 1000 to and from the bike pedal 1002 is a marked-improvement over the prior art in which the conventional bike shoe and bike pedal had a coupling mechanism which requires a great degree of dexterity on the part of the person to use when they want to engage and disengage their foot from the bicycle. In addition, the user of the traditional bike shoe when not riding the bicycle would often have difficulty walking due to the coupling mechanism. This is not a problem with the bike shoe 1000 since the first magnetic field emission structure 1016 can be substantially flush with the outer surface 1008.

In operation, the user can place their foot within the bike shoe 1000 which incorporates the first magnetic field emission structure 1016. The user would then move the bike shoe 1000 towards the bike pedal 1002 which incorporates the second magnetic field emission structure 1018. Then, the user would align the bike shoe 1000 with the bike pedal 1002 such that the bike shoe 1000 can be attached to the bike pedal 1002 when the first and second magnetic field emission structures 1016 and 1018 are located next to one another and have a certain alignment with respect to one another. The user can release the bike shoe 1000 from the bike pedal 1002 by turning the first magnetic field emission structure 1016 relative to the second magnetic field emission structure 1018. This is possible because each of the first and second magnetic field emission structures 1016 and 1018 includes an array of field emission sources 1016a and 1018a each having positions and polarities relating to a desired spatial force function that corresponds to a relative alignment of the first and second magnetic field emission structures 1016 and 1018 within a field domain. Each field emission source of each array of field emission sources 1016a and 1018a has a corresponding field emission amplitude and vector direction determined in accordance with the desired spatial force function, where a separation distance between the first and second magnetic field emission structures 1016 and 1018 and the relative alignment of the first and second magnetic field emission structures 1016 and 1018 creates a spatial force in accordance the desired spatial force function. The field domain corresponds to first field emissions from the array of first field emission sources 1016a of the first magnetic field emission structure 1016 interacting with second field emissions from the array of second field emission sources 1018a of the second magnetic field emission structure 1018.

Figure 12A:
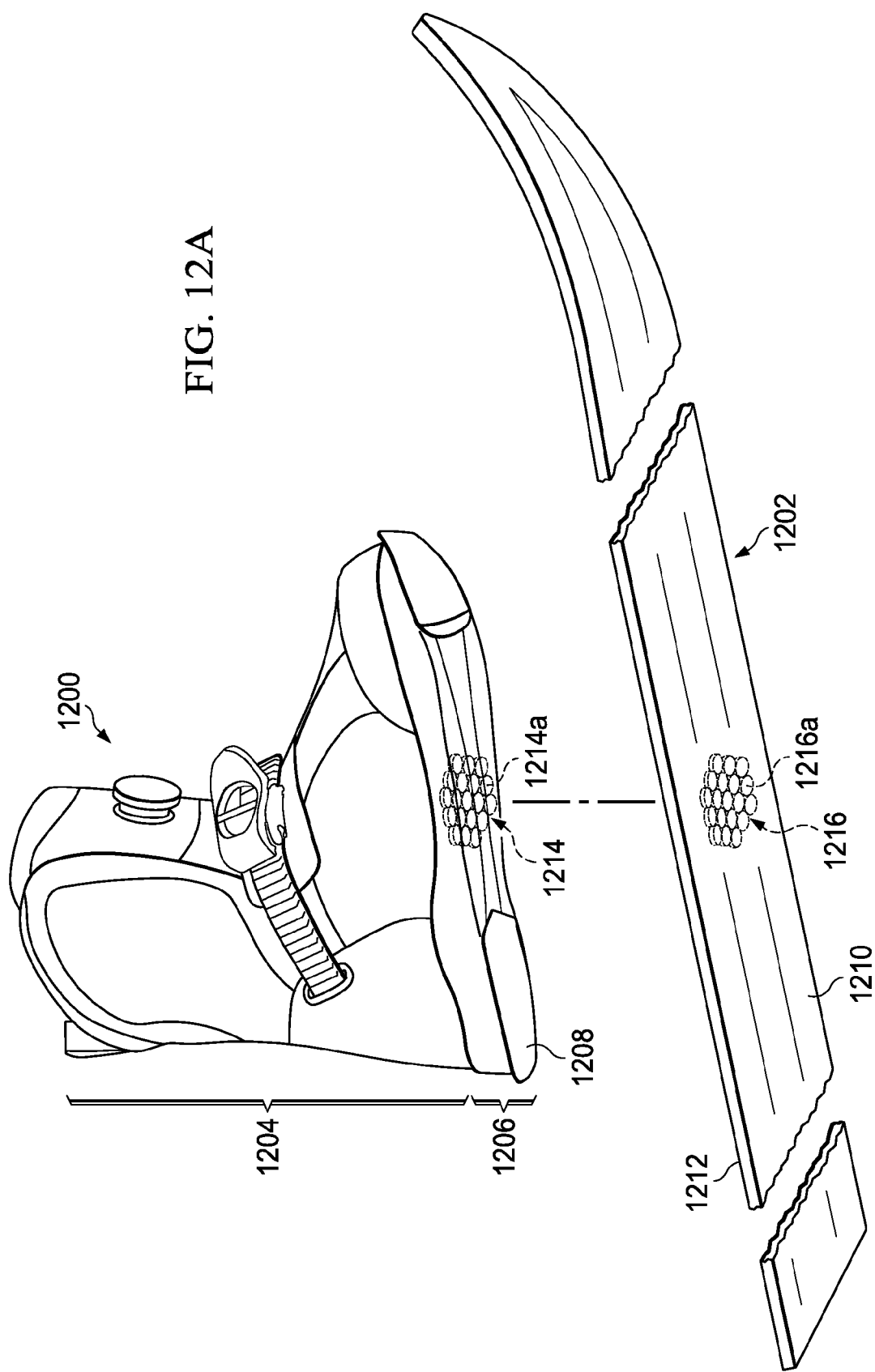
FIG. 12 is a diagram of an exemplary correlated magnetic snow ski boot and an exemplary correlated magnetic snow ski in accordance with an embodiment of the present invention.
Figure 12B:
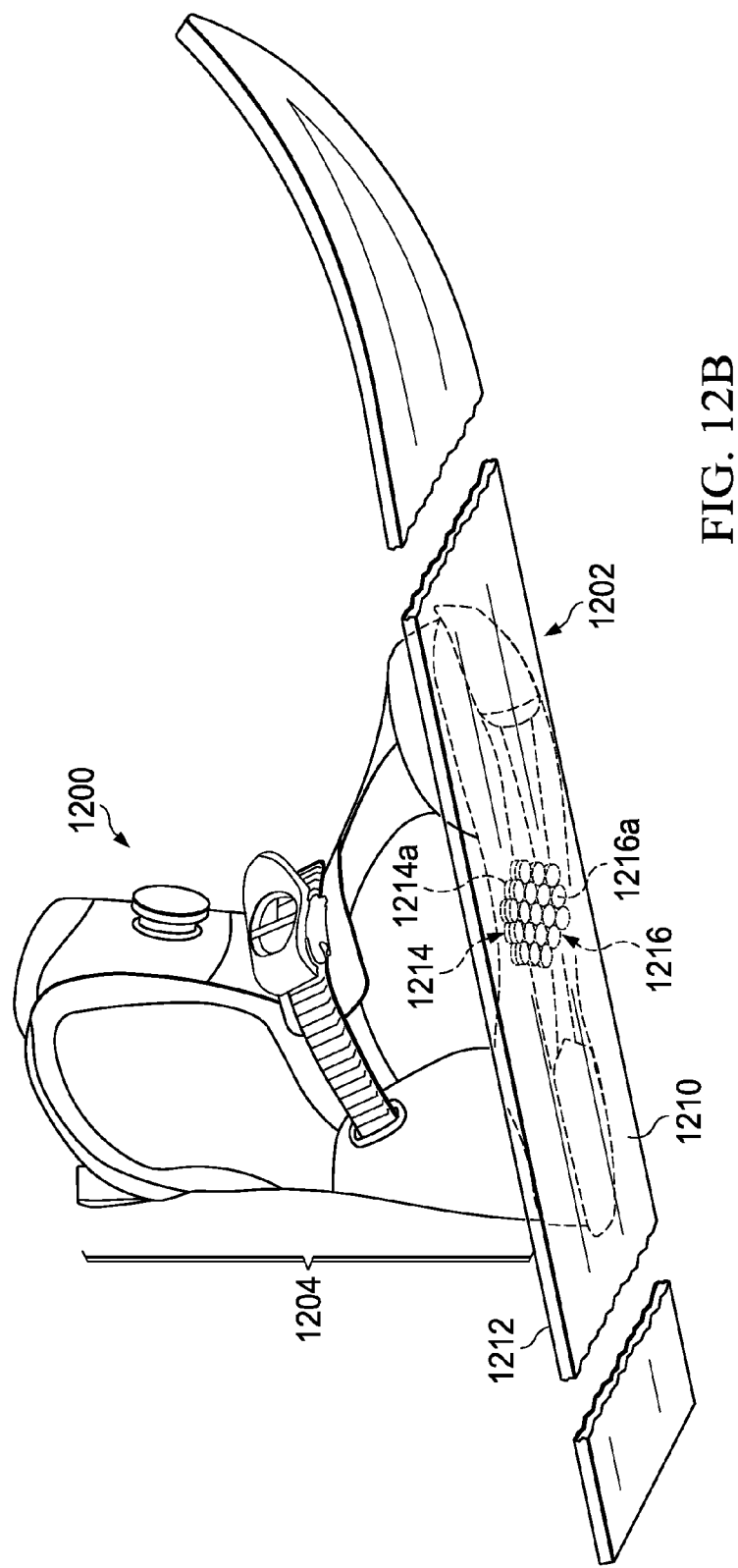

Referring to FIGS. 12A-12B, there are diagrams of an exemplary correlated magnetic snow ski boot 1200 and a corresponding correlated magnetic snow ski 1202 in accordance with an embodiment of the present invention. The snow ski boot 1200 has an upper peripheral portion 1204 which is fixedly coupled to a sole portion 1206 which has an outer surface 1208 that interfaces with the corresponding snow ski 1202. The precise construction of the upper peripheral portion 1204 and the sole portion 1206 will not be discussed or illustrated in detail herein, since the basic construction of a snow ski boot is well-known in the art. The snow ski 1202 includes a main body 1210 that has an outer surface 1212 that interfaces with the corresponding snow ski boot 1200. Likewise, the precise construction of the main body 1210 will not be discussed or illustrated in detail herein, since the basic construction of a snow ski is well-known in the art. Moreover, it should be apparent to those skilled in the art that the present invention should not be limited to the precise construction of the non-claimed portion of the snow ski boot 1200 and snow ski 1202 as discussed and illustrated herein.

In one embodiment, the snow ski boot 1200 has a first field emission structure 1214 (more possible) incorporated within or attached to the outer surface 1208. The snow ski 1202 has a second field emission structure 1216 (more possible) incorporated within or attached to the outer surface 1212. The first magnetic field emission structure 1214 is configured to interact with the second magnetic field emission structure 1216 such that the snow ski boot 1200 can be attached (secured) to or removed from the snow ski 1202 when desired. In particular, the snow ski boot 1200 can be attached to the snow ski 1202 when their respective first and second magnetic field emission structures 1214 and 1216 are located next to one another and have a certain alignment with respect to one another (see FIG. 12B) (see also FIGS. 11A-11I). The snow ski boot 1200 is attached to the snow ski 1202 with a desired strength to prevent the snow ski boot 1200 from being disengaged from the snow ski 1202 inadvertently, particularly while the user is skiing or riding on a ski lift. The snow ski boot 1200 can be released from the snow ski 1202 when their respective first and second magnetic field emission structures 1214 and 1216 are turned with respect to one another (see FIG. 12A) (see also FIGS. 11A-11I). This is all possible because the first and second magnetic field emission structures 1214 and 1216 each comprise of an array of field emission sources 1214a and 1216a (e.g., an array of magnets 1214a and 1216a) each having positions and polarities relating to a desired spatial force function that corresponds to a relative alignment of the first and second magnetic field emission structures 1214 and 1216 within a field domain (see discussion about correlated magnet technology).

In operation, the user can place their foot within the snow ski boot 1200 which incorporates the first magnetic field emission structure 1214. The user would then move the snow ski boot 1200 towards the snow ski 1202 which incorporates the second magnetic field emission structure 1216. Then, the user would align the snow ski boot 1200 with the snow ski 1202 such that the snow ski boot 1200 can be attached to the snow ski 1202 when the first and second magnetic field emission structures 1214 and 1216 are located next to one another and have a certain alignment with respect to one another. The user can release the snow ski boot 1200 from the snow ski 1202 by turning the first magnetic field emission structure 1214 relative to the second magnetic field emission structure 1216 (see FIGS. 11A-11I). This is possible because each of the first and second magnetic field emission structures 1214 and 1216 includes an array of field emission sources 1214a and 1216a each having positions and polarities relating to a desired spatial force function that corresponds to a relative alignment of the first and second magnetic field emission structures 1214 and 1216 within a field domain. Each field emission source of each array of field emission sources 1214a and 1216a has a corresponding field emission amplitude and vector direction determined in accordance with the desired spatial force function, where a separation distance between the first and second magnetic field emission structures 1214 and 1216 and the relative alignment of the first and second magnetic field emission structures 1214 and 1216 creates a spatial force in accordance the desired spatial force function. The field domain corresponds to first field emissions from the array of first field emission sources 1214a of the first magnetic field emission structure 1214 interacting with second field emissions from the array of second field emission sources 1216a of the second magnetic field emission structure 1216. This way of securing and removing the snow ski boot 1200 to and from the snow ski 1202 is a marked-improvement over the prior art in which the conventional snow ski has a binding mechanism which requires a great degree of dexterity and strength on the part of the person to use when they want to engage and disengage their foot from the snow ski.

Figure 13A:
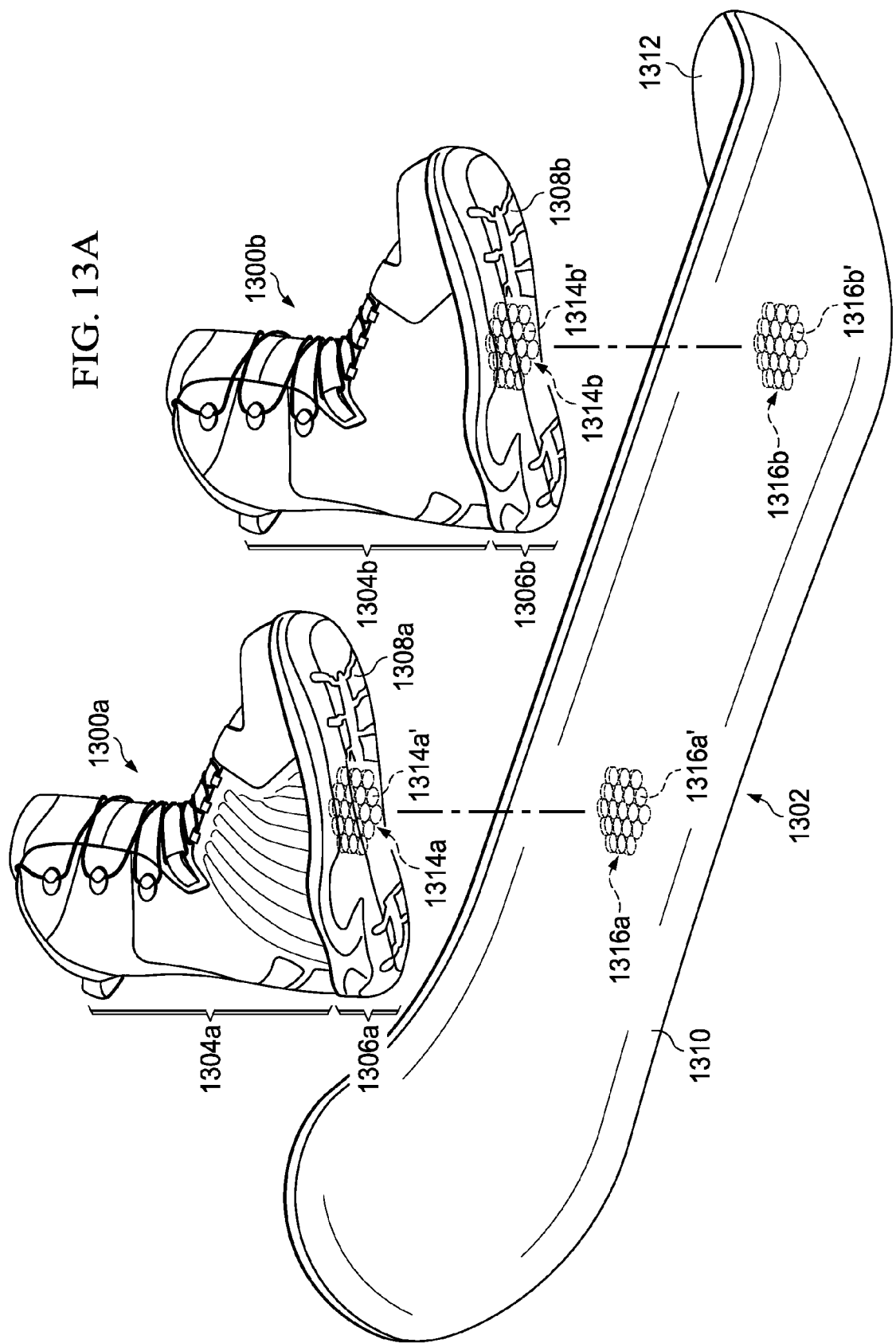
FIG. 13 is a diagram of an exemplary correlated magnetic snowboard boot and an exemplary correlated magnetic snowboard in accordance with an embodiment of the present invention.
Figure 13B:
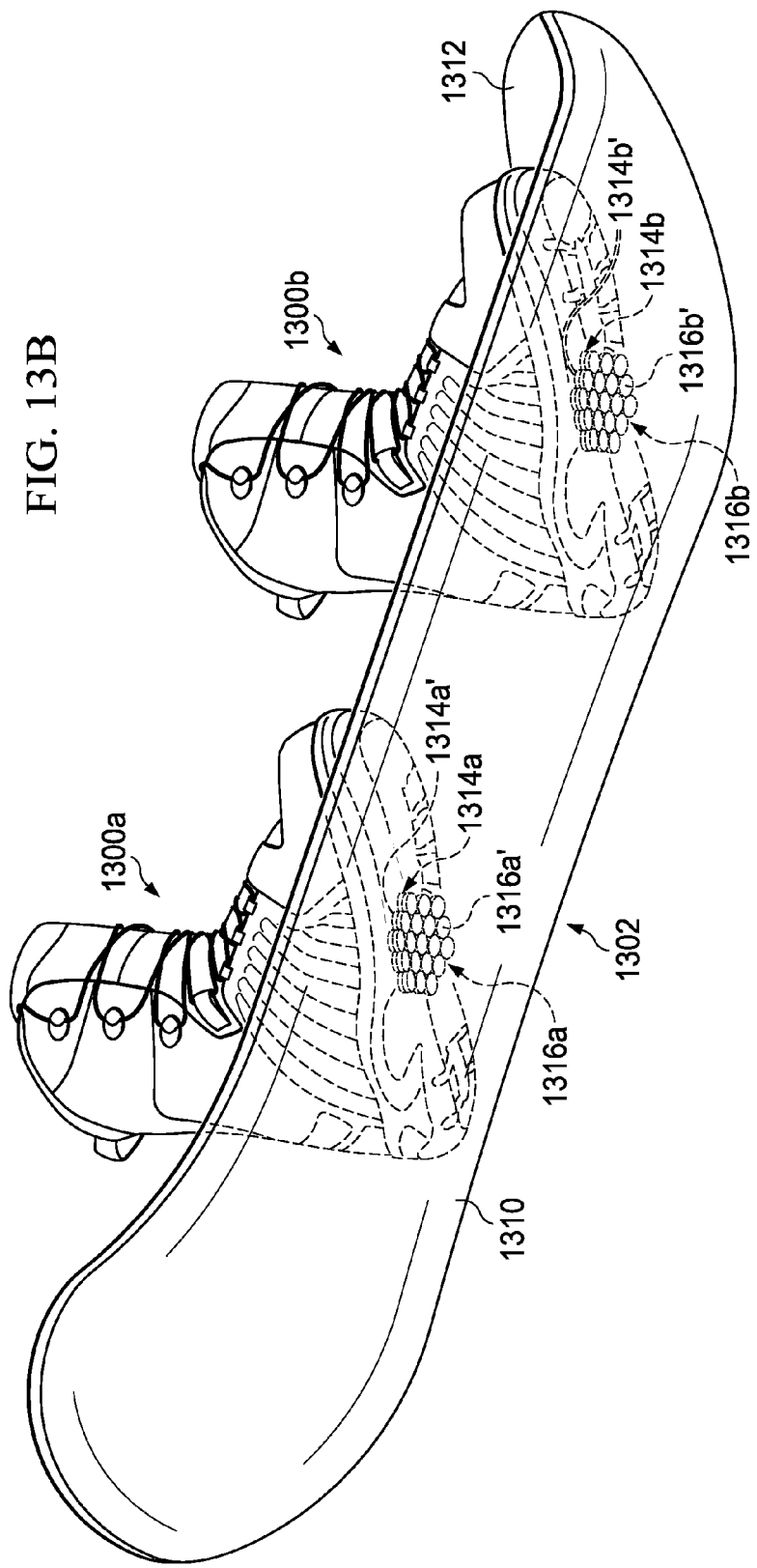

Referring to FIGS. 13A-13B, there are diagrams of two exemplary correlated magnetic snowboard boots 1300a and 1300b and a corresponding correlated magnetic snowboard 1302 in accordance with an embodiment of the present invention. Each snowboard boot 1300a and 1300b has an upper peripheral portion 1304a and 1304b which is fixedly coupled to a sole portion 1306a and 1306b which has an outer surface 1308a and 1308b that interfaces with the corresponding snowboard 1302. The precise construction of the upper peripheral portion 1304a and 1304b and the sole portion 1306a and 1306b will not be discussed or illustrated in detail herein, since the basic construction of a snow ski boot is well-known in the art. The snowboard 1302 includes a main body 1310 that has an outer surface 1312 that interfaces with the corresponding snowboard boots 1300a and 1300b. Likewise, the precise construction of the main body 1310 will not be discussed or illustrated in detail herein, since the basic construction of a snow ski is well-known in the art. Moreover, it should be apparent to those skilled in the art that the present invention should not be limited to the precise construction of the non-claimed portion of the snowboard boots 1300a and 1300b and snowboard 1302 as discussed and illustrated herein.

In one embodiment, each snowboard boot 1300a and 1300b respectively has a first field emission structure 1314a and 1314b (more possible) incorporated within or attached to the outer surface 1308. The snowboard 1302 has a pair of second field emission structures 1316a and 1316b (more possible) incorporated within or attached to the outer surface 1312. Each first magnetic field emission structure 1314a and 1314b is configured to respectively interact with the second magnetic field emission structures 1316a and 1316b such that the respective snowboard boots 1300a and 1300b can be attached (secured) to or removed from the snowboard 1302 when desired. In particular, each snowboard boot 1300a and 1300b can be attached to the snowboard 1302 when their respective first and second magnetic field emission structures 1314a/1316a, and 1314b/1316b are located next to one another and have a certain alignment with respect to one another (see FIG. 12B) (see also FIGS. 11A-11I). Each snowboard boot 1300a and 1300b is attached to the snowboard 1302 with a desired strength to prevent the snowboard boots 1300a and 1300b from being disengaged from the snowboard 1302 inadvertently, particularly while the user is snowboarding or riding on a ski lift. Each snowboard boot 1300a and 1300b can be released from the snowboard 1302 when their respective first and second magnetic field emission structures 1314a/1316a, and 1314b/1316b are turned with respect to one another (see FIG. 12A) (see also FIGS. 11A-11I). This is all possible because the first and second magnetic field emission structures 1314a, 1314b, 1316a and 1316b each comprise of an array of field emission sources 1314a', 1314b', 1316a' and 1316b' (e.g., an array of magnets 1314a', 1314b', 1316a' and 1316b') each having positions and polarities relating to a desired spatial force function that corresponds to a relative alignment of the first and second magnetic field emission structures 1314a, 1314b, 1316a and 1316b within a field domain (see discussion about correlated magnet technology).

If desired, each snowboard boot 1300a and 1300b could have a unique magnetic field emission structure 1314a and 1314b which would only interact with a corresponding unique mirror image field emission structure 1316a and 1316b on the snowboard 1302 In particular, the snowboard boot 1300a may have a magnetic field emission structure 1314a that is configured and/or decoded differently than the magnetic field emission structure 1314b associated with snowboard boot 1300b. This is desirable since it would help ensure that the right snowboard boot 1300a and the left snowboard boot 1300b can be secured to the correct positions on the snowboard 1302 (note: the aforementioned bike shoes 1000 and snow ski boots 1200 can be configured the same way to help differentiate the right and left bike pedals 1002 and snow skis 1202).

In operation, the user can place their foot within the snowboard boot 1300a (for example) which incorporates the first magnetic field emission structure 1314a. The user would then move the snowboard boot 1300a towards the snowboard 1302 which incorporates the second magnetic field emission structure 1316a. Then, the user would align the snowboard boot 1300a with the snowboard 1302 such that the snowboard boot 1300a can be attached to the snowboard 1302 when the first and second magnetic field emission structures 1314a and 1316a are located next to one another and have a certain alignment with respect to one another. The user can release the snowboard boot 1300a from the snowboard 1302 by turning the first magnetic field emission structure 1314a relative to the second magnetic field emission structure 1316a (see FIGS. 11A-11I). This is possible because each of the first and second magnetic field emission structures 1314a and 1316a includes an array of field emission sources 1314a' and 1316a' each having positions and polarities relating to a desired spatial force function that corresponds to a relative alignment of the first and second magnetic field emission structures 1314a and 1316a within a field domain. Each field emission source of each array of field emission sources 1314a' and 1316a' has a corresponding field emission amplitude and vector direction determined in accordance with the desired spatial force function, where a separation distance between the first and second magnetic field emission structures 1314a and 1316a and the relative alignment of the first and second magnetic field emission structures 1314a and 1316a creates a spatial force in accordance the desired spatial force function. The field domain corresponds to first field emissions from the array of first field emission sources 1314a' of the first magnetic field emission structure 1314a respectively interacting with second field emissions from the array of second field emission sources 1316a' of the second magnetic field emission structure 1316a. The person can follow these same steps to attach or remove the other snowboard boot 1300b to and from the snowboard 1302. This way of securing and removing the snowboard boots 1300a and 1300b to and from the snowboard 1302 is a marked-improvement over the prior art in which the conventional snow ski has a binding mechanism which requires a great degree of dexterity and strength on the part of the person to use when they want to engage and disengage their foot from the snow ski.

In all of the embodiments, the footwear 1000, 1200 and 1300 and/or their corresponding devices 1002, 1202 and 1302 if desired can be configured such that the person can move the field emission structures so they can align them with their counterpart field emission structures for purposes of comfort. For instance, the bike shoe 1000 can have a cavity formed within the outer surface 1008 that enables the person to move and secure the field emission structure 1016 in a desired location such that their knee will not hurt when the bike shoe 1000 is attached to the bike pedal 1002.

Moreover, in all of the embodiments, the footwear 1000, 1200 and 1300 and/or their corresponding devices 1002, 1202 and 1302 if desired can have another magnetic field emission structure incorporated therein that enable them to be attached to other surfaces or objects within an environment such as on a ski lift, on the wall in a shop-garage, or any other location like a vehicle, the side of a boat etc. . . . which has the appropriate magnetic field emission structure(s). Even display racks in stores can incorporate the appropriate magnetic field emission structures to support the correlated magnetic footwear 1000, 1200 and 1300 and/or their corresponding devices 1002, 1202 and 1302. It should be readily appreciated that only one footwear 1000, 1200 and 1300 has been described and illustrated above but that the user would typically use a pair of the footwear 1000, 1200 and 1300 which are the same except that the right footwear would be a mirror image of the left footwear.

Although multiple embodiments of the present invention have been illustrated in the accompanying Drawings and described in the foregoing Detailed Description, it should be understood that the present invention is not limited to the disclosed embodiments, but is capable of numerous rearrangements, modifications and substitutions without departing from the invention as set forth and defined by the following claims.

The invention claimed is:

1. An assembly comprising:
a footwear including a first field emission structure; and
a device including a second field emission structure, where the footwear is attached to said device when the first and second field emission structures are located next to one another and have a certain alignment with respect to one another, where each of the first and second field emission structures include a plurality of field emission sources having positions and polarities relating to a desired spatial force function that corresponds to a relative alignment of the first and second field emission structures within a field domain, said spatial force function being in accordance with a code, said code corresponding to a code modulo of said first plurality of field emission sources and a complementary code modulo of said second plurality of field emission sources, said code defining a peak spatial force corresponding to substantial alignment of said code modulo of said first plurality of field emission sources with said complementary code modulo of said second plurality of field emission sources, said code also defining a plurality of off peak spatial forces corresponding to a plurality of different misalignments of said code modulo of said first plurality of field emission sources and said complementary code modulo of said second plurality of field emission sources, said plurality of off peak spatial forces having a largest off peak spatial force, said largest off peak spatial force being less than half of said peak spatial force.

2. The assembly of claim 1, wherein the footwear is released from the device when the first and second field emission structures are turned with respect to one another.

3. The assembly of claim 1, wherein the footwear is a bike shoe, a snow ski boot, a snowboard boot, a wakeboard boot, a water ski boot, or a work boot.

4. The assembly of claim 1, wherein the device is a bike pedal, a snow ski, a snowboard, a wakeboard, a water ski, or a work platform.

5. The assembly of claim 1, wherein said positions and said polarities of each of said field emission sources are determined in accordance with at least one correlation function.

6. The assembly of claim 5, wherein said at least one correlation function is in accordance with at least one code.

7. The assembly of claim 6, wherein said at least one code is at least one of a pseudorandom code, a deterministic code, or a designed code.

8. The assembly of claim 6, wherein said at least one code is one of a one dimensional code, a two dimensional code, a three dimensional code, or a four dimensional code.

9. The assembly of claim 1, wherein each of said field emission sources has a corresponding field emission amplitude and vector direction determined in accordance with the desired spatial force function, wherein a separation distance between the first and second field emission structures and the relative alignment of the first and second field emission structures creates a spatial force in accordance with the desired spatial force function.

10. The assembly of claim 9, wherein said spatial force comprises at least one of an attractive spatial force or a repellant spatial force.

11. The assembly of claim 9 wherein said spatial force corresponds to a peak spatial force of said desired spatial force function when said first and second field emission structures are substantially aligned such that each field emission source of said first field emission structure substantially aligns with a corresponding field emission source of said second field emission structure.

12. The assembly of claim 1, wherein said field domain corresponds to first field emissions from said first field emission sources of said first field emission structure interacting with second field emissions from said second field emission sources of said second field emission structure.

13. The assembly of claim 1, wherein said polarities of the field emission sources include at least one of North-South polarities or positive-negative polarities.

14. The assembly of claim 1, wherein at least one of said field emission sources include a magnetic field emission source or an electric field emission source.

15. The assembly of claim 1, wherein at least one of said field emission sources include a permanent magnet, an electromagnet, an electret, a magnetized ferromagnetic material, a portion of a magnetized ferromagnetic material, a soft magnetic material, or a superconductive magnetic material.

16. A footwear, comprising:
a surface that incorporates a first field emission structure, where the first field emission structure is configured to interface with a second field emission structure incorporated within a device, where the surface is attached to the device when the first and second field emission structures are located next to one another and have a certain alignment with respect to one another, where each of the first and second field emission structures include a plurality of field emission sources having positions and polarities relating to a desired spatial force function that corresponds to a relative alignment of the first and second field emission structures within a field domain, said spatial force function being in accordance with a code, said code corresponding to a code modulo of said first plurality of field emission sources and a complementary code modulo of said second plurality of field emission sources, said code defining a peak spatial force corresponding to substantial alignment of said code modulo of said first plurality of field emission sources with said complementary code modulo of said second plurality of field emission sources, said code also defining a plurality of off peak spatial forces corresponding to a plurality of different misalignments of said code modulo of said first plurality of field emission sources and said complementary code modulo of said second plurality of field emission sources, said plurality of off peak spatial forces having a largest off peak spatial force, said largest off peak spatial force being less than half of said peak spatial force.

17. The footwear of claim 16, wherein the surface is released from the device when the first and second field emission structures are turned with respect to one another.

18. A device, comprising:
a surface that incorporates a first field emission structure, where the first field emission structure is configured to interface with a second field emission structure incorporated within a footwear, where the surface is attached to the footwear when the first and second field emission structures are located next to one another and have a certain alignment with respect to one another, where each of the first and second field emission structures include a plurality of field emission sources having positions and polarities relating to a desired spatial force function that corresponds to a relative alignment of the first and second field emission structures within a field domain, said spatial force function being in accordance with a code, said code corresponding to a code modulo of said first plurality of field emission sources and a complementary code modulo of said second plurality of field emission sources, said code defining a peak spatial force corresponding to substantial alignment of said code modulo of said first plurality of field emission sources with said complementary code modulo of said second plurality of field emission sources, said code also defining a plurality of off peak spatial forces corresponding to a plurality of different misalignments of said code modulo of said first plurality of field emission sources and said complementary code modulo of said second plurality of field emission sources, said plurality of off peak spatial forces having a largest off peak spatial force, said largest off peak spatial force being less than half of said peak spatial force.

19. The device of claim 18, wherein the surface is released from the footwear when the first and second field emission structures are turned with respect to one another.

20. A method for enabling a user to attach a foot to a device, said method comprising the steps of:
placing the foot within a footwear, where the footwear incorporates a first field emission structure;
moving the footwear towards the device, where the device incorporates a second field emission structure; and
aligning the footwear with the device such that the footwear will be attached to the device when the first and second field emission structures are located next to one another and have a certain alignment with respect to one another, where each of the first and second field emission structures include a plurality of field emission sources having positions and polarities relating to a desired spatial force function that corresponds to a relative alignment of the first and second field emission structures within a field domain, said spatial force function being in accordance with a code, said code corresponding to a code modulo of said first plurality of field emission sources and a complementary code modulo of said second plurality of field emission sources, said code defining a peak spatial force corresponding to substantial alignment of said code modulo of said first plurality of field emission sources with said complementary code modulo of said second plurality of field emission sources, said code also defining a plurality of off peak spatial forces corresponding to a plurality of different misalignments of said code modulo of said first plurality of field emission sources and said complementary code modulo of said second plurality of field emission sources, said plurality of off peak spatial forces having a largest off peak spatial force, said largest off peak spatial force being less than half of said peak spatial force.

21. The method of claim 20, further comprising a step of releasing the footwear from the device, where the footwear is released from the device when the first and second field emission structures are turned with respect to one another.

22. The method of claim 20, wherein the footwear is a bike shoe, a snow ski boot, a snowboard boot, a wakeboard boot, a water ski boot, or a work boot.

23. The method of claim 20, wherein the device is a bike pedal, a snow ski, a snowboard, a wakeboard, a water ski, or a work platform.

24. The method of claim 20, wherein the footwear has another field emission structure which enables the footwear to be attached to or removed from a surface or an object within an environment having an appropriate field emission structure.

25. The method of claim 20, wherein the device has another field emission structure which enables the device to be attached to or removed from a surface or an object within an environment having an appropriate field emission structure.

* * * * *